(12) United States Patent
Wang et al.

(10) Patent No.: US 11,455,709 B2
(45) Date of Patent: Sep. 27, 2022

(54) METHODS AND SYSTEMS FOR IMAGE PROCESSING

(71) Applicant: ZHEJIANG DAHUA TECHNOLOGY CO., LTD., Zhejiang (CN)

(72) Inventors: Yin Wang, Hangzhou (CN); Haomi Wang, Hangzhou (CN); Wei Fang, Hangzhou (CN)

(73) Assignee: ZHEJIANG DAHUA TECHNOLOGY CO., LTD., Hangzhou (CN)

( * ) Notice: Subject to any disclaimer, the term of this patent is extended or adjusted under 35 U.S.C. 154(b) by 228 days.

(21) Appl. No.: 16/876,104

(22) Filed: May 17, 2020

(65) Prior Publication Data
US 2020/0279357 A1 Sep. 3, 2020

Related U.S. Application Data

(63) Continuation of application No. PCT/CN2018/115405, filed on Nov. 14, 2018.

(30) Foreign Application Priority Data

Nov. 17, 2017 (CN) .......................... 201711148168.7

(51) Int. Cl.
*G06T 5/50* (2006.01)
*G06T 7/80* (2017.01)
*G06T 3/40* (2006.01)

(52) U.S. Cl.
CPC .............. *G06T 5/50* (2013.01); *G06T 3/4038* (2013.01); *G06T 7/80* (2017.01)

(58) Field of Classification Search
CPC ........... G06T 5/50; G06T 3/4038; G06T 7/80; G06T 2207/20021; G06T 3/0012
See application file for complete search history.

(56) References Cited

U.S. PATENT DOCUMENTS 6,337,683 B1 1/2002 Gilbert et al.
8,463,074 B2 6/2013 Fuchs et al.
(Continued)

FOREIGN PATENT DOCUMENTS

CN 105516597 A 4/2016
CN 106447608 A 2/2017
(Continued)

OTHER PUBLICATIONS

Lu Jiaming et al., Real-time 4K Panoramic Video Stitching Based on GPU Acceleration, Computer Science, 44(8), 2017, 5 pages.
(Continued)

*Primary Examiner* — Emily C Terrell
*Assistant Examiner* — Molly Wilburn
(74) *Attorney, Agent, or Firm* — Metis IP LLC

(57) ABSTRACT

A method and system for image processing are provided in the present disclosure. The method may include obtaining a plurality of source images generated by a plurality of imaging sensors. The method may also include processing each of the plurality of source images by: retrieving a plurality of source image blocks from the source image according to block position information associated with the corresponding imaging sensor; generating, for each of the plurality of source image blocks, a target image block based on the source image block; and forming a target image based on the generated target image blocks. The method may further include generating a combined image based on the target images.

18 Claims, 13 Drawing Sheets

(56) References Cited

U.S. PATENT DOCUMENTS

| | | | |
|---|---|---|---|
| 9,560,269 B2 | 1/2017 | Baldwin | |
| 2004/0076330 A1* | 4/2004 | Sloan | G06V 10/50 |
| | | | 382/218 |
| 2004/0234124 A1* | 11/2004 | Nakai | G06T 7/564 |
| | | | 382/154 |
| 2008/0285652 A1 | 11/2008 | Oxman et al. | |
| 2011/0176731 A1 | 7/2011 | Fukushi | |
| 2013/0121537 A1* | 5/2013 | Monobe | G01C 3/32 |
| | | | 382/106 |
| 2015/0036945 A1* | 2/2015 | Zuliani | G06T 5/005 |
| | | | 382/266 |
| 2015/0040165 A1 | 2/2015 | Zajac | |
| 2019/0180475 A1* | 6/2019 | Nash | H04N 1/00087 |
| 2020/0034989 A1* | 1/2020 | Koyama | G06T 7/85 |
| 2020/0143545 A1* | 5/2020 | Weng | B64C 39/024 |

FOREIGN PATENT DOCUMENTS

| | | | |
|---|---|---|---|
| CN | 103763479 B | | 3/2017 |
| CN | 106815808 A | * | 6/2017 |
| CN | 106815808 A | | 6/2017 |
| CN | 106875339 A | | 6/2017 |
| CN | 107274346 A | | 10/2017 |
| WO | 2019096156 A1 | | 5/2019 |

OTHER PUBLICATIONS

International Search Report in PCT/CN2018/115405 dated Feb. 19, 2019, 4 pages.
Written Opinion in PCT/CN2018/115405 dated Feb. 19, 2019, 6 pages.
Partial European Search Report in European Application No. 18879498.6 dated Oct. 27, 2020, 12 pages.

* cited by examiner

500

```
┌─────────────────────────────────────────┐  510
│ Retrieving a plurality of source image  │
│ blocks from the source image according  │
│ to block position information           │
│ associated with the corresponding       │
│ imaging sensor                          │
└─────────────────────────────────────────┘
                    ↓
┌─────────────────────────────────────────┐  520
│ Generating, for each of the plurality   │
│ of source image blocks, a target image  │
│ block based on the source image block   │
└─────────────────────────────────────────┘
                    ↓
┌─────────────────────────────────────────┐  530
│ Forming a corresponding target image    │
│ based on the generated target image     │
│ blocks                                  │
└─────────────────────────────────────────┘
```

810 Dividing the *k*th calibration target image into a plurality of calibration target image blocks

820 For each of the plurality of calibration target image blocks, identifying an image region in the *k*th calibration source image including pixels for generating the calibration target image block as a corresponding calibration source image block

830 Obtaining the block position information associated with the *k*th imaging sensor indicating positions of the calibration source image blocks in the corresponding calibration source image

1110: Obtaining a plurality of source video streams and determining block position information, wherein each item of the block position information may indicate the position of a source image block in the plurality of source video streams.

1120: Retrieving, based on each item of the block position information, a source image block from the plurality of source video streams 1130: Generating a plurality of target images based on the obtained source image blocks, and combining the plurality of target images into a panorama

FIG. 11

METHODS AND SYSTEMS FOR IMAGE PROCESSING

CROSS REFERENCE TO RELATED APPLICATIONS

This application is a continuation of International Application No. PCT/CN2018/115405 filed on Nov. 14, 2018, which claims priority of Chinese Application No. 201711148168.7 filed on Nov. 17, 2017, the entire contents of each of which are hereby incorporated by reference.

TECHNICAL FIELD

The present disclosure generally relates to methods and systems for image processing, and particularly relates to methods and systems for generating a panorama.

BACKGROUND

At present, methods for obtaining a panorama with a wide-angle view including image information mainly include: 1. using an imaging system that implements a hyper hemispherical imaging using a single optical system, such as a fisheye lens system, to form a panorama with a wide viewing angle of more than 180°; 2. adopting a simple splicing method, that is, directly splicing the image sequences (possibly including overlapping portions) captured by multiple cameras (e.g., in the form of a multi-channel camera system) without any further processing to form a panorama with a wide-angle view; 3. using a central processing unit (CPU) and/or a graphics processing unit (GPU) to stitch the image sequences collected by multiple cameras, including transforming the coordinate systems of the overlapping image sequences collected by multiple cameras to project the original images onto a same two-dimensional plane to form a plurality of two-dimensional images, correcting the distortions of the plurality of two-dimensional images, performing an image registration on the overlapping region of any two adjacent two-dimensional images, and performing an image fusion on the images to form a panorama with a wide-angle view.

In the above first method, an imaging system that implements a hyper hemispherical imaging using a single optical system may cause an inevitable large distortion, and the resolution at the edges of the field of view (FOV) is greatly lower compared to the resolution at the center of the FOV. For obtaining a more accurate panorama, a post-processing may be needed, resulting in a low efficiency for obtaining accurate panoramas. In the above second method, due to image distortion, directly splicing the images captured by the multiple cameras may result in obvious seams. Also, due to errors on the angles of the cameras, the seams may have obvious overlapping portions. With such a method, to obtain an accurate panorama, a post-processing is still required, resulting in a low efficiency for obtaining accurate panoramas. In the above third method, a CPU and/or a GPU are used to stitch the images collected by multiple cameras according to a stitching algorithm. Due to the low efficiency of the stitching, such a method is hard to meet the requirements for generating real-time video streams, especially the requirements for generating high-resolution real-time video streams.

In summary, there is a technical problem of low efficiency for generating panoramas in the art.

SUMMARY

According to an aspect of the present disclosure, a method for image processing is provided. The method may include obtaining a plurality of source images generated by a plurality of imaging sensors. The method may also include processing each of the plurality of source images by: retrieving a plurality of source image blocks from the source image according to block position information associated with the corresponding imaging sensor; generating, for each of the plurality of source image blocks, a target image block based on the source image block; and forming a target image based on the generated target image blocks. The method may further include generating a combined image based on the target images.

In some embodiments, the method may further include obtaining the block position information associated with each of the plurality of imaging sensors by: retrieving a plurality of calibration source images generated by the plurality of imaging sensors; generating, based on the plurality of calibration source images, a plurality of calibration target images; and for each of the plurality of imaging sensors, performing a process as following. The process may include: dividing the corresponding calibration target image into a plurality of calibration target image blocks; for each of the plurality of calibration target image blocks, identifying an image region in the calibration source image including pixels for generating the calibration target image block as a corresponding calibration source image block; and obtaining the block position information associated with the imaging sensor indicating positions of the calibration source image blocks in the corresponding calibration source image.

In some embodiments, the identifying an image region in the calibration source image including pixels for generating the calibration target image block as a corresponding calibration source image block may include, for each pixel of the calibration target image block: identifying one or more pixels in the calibration source image used for generating the pixel; and obtaining a coordinate range of the plurality of source pixels in the calibration source image, wherein the calibration source image block is an image portion within the coordinate range.

In some embodiments, the source image may be a frame of a digital video stream, and the calibration source image may be a frame of the digital video stream before the source image.

In some embodiments, the method may further include: in response to a change of one or more imaging parameters of a target imaging sensor of the plurality of imaging sensors, re-obtaining at least the block position information of the target imaging device.

In some embodiments, the method may further include: in response to an adding of an additional imaging sensor to the plurality of imaging sensors, obtaining the block information of the additional imaging sensor.

In some embodiments, the method may further include storing the plurality of source images into a first storage device of the image processing device. The retrieving a plurality of source image blocks in the source image according to block position information may include: transmitting, via a burst transmission protocol, according to the block position information associated with the corresponding imaging sensor, an ith source image block from the first storage device to a second storage device of the image processing device, wherein i is an integer between 1 and the total number of the source image blocks. Data of the ith source image block for generating an ith target image block may be retrieved from the second storage device.

In some embodiments, the generating, for each of the plurality of source image blocks, a target image block based on the source image block may include processing the source image block by: retrieving, for generating a jth target pixel of the ith target image block, data of one or more source pixels of the ith source image block needed for generating the jth target pixel from the second storage device, wherein j is an integer between 1 and the total number of the target pixels of the ith target image block; and computing data of the jth target pixel based on the data of the one or more source pixels retrieved.

In some embodiments, the image processing device may include multiple second storage devices. The plurality of source image blocks may be transmitted from the first storage device to the multiple second storage devices in turn, and the processing of a first source image block in one of the multiple second storage devices and the transmission of a second source image block from the first storage device to another one of the multiple second storage devices may be performed concurrently.

In some embodiments, the image processing device may include multiple second storage devices. Each of the multiple second storage devices may be in communication with a processing core of the image processing device. The processing cores may operate concurrently to generate the target image blocks based on the source image blocks transmitted to the corresponding second storage devices.

In some embodiments, the forming a target image based on the generated target image blocks may include: constructing a continuous storage region in a third storage device for storing the data of pixels of the target image, wherein the continuous storage region includes continuous storage units, each of which corresponds to a pixel of the target image; and storing the target image blocks into the continuous storage region.

According to another aspect of the present disclosure, a system for image processing is provided. The system may include a plurality of imaging sensors, a storage medium, and at least one processor in communication with the storage medium. The storage medium may include instructions. When executing the instructions, the at least one processor may be directed to obtain a plurality of source images generated by the plurality of imaging sensors. The at least one processor may also be directed to process each of the plurality of source images by: retrieving a plurality of source image blocks from the source image according to block position information associated with the corresponding imaging sensor; generating, for each of the plurality of source image blocks, a target image block based on the source image block; and forming a target image based on the generated target image blocks. The at least one processor may further be directed to generate a combined image based on the target images.

According yet to another aspect of the present disclosure, a system for image processing is provided. The system may include an image obtaining module, a processing module, and an image combination module. The image obtaining module may be configured to obtain a plurality of source images generated by a plurality of imaging sensors. The processing module may be configured to process each of the plurality of source images by: retrieving a plurality of source image blocks from the source image according to block position information associated with the corresponding imaging sensor; generating, for each of the plurality of source image blocks, a target image block based on the source image block; and forming a target image based on the generated target image blocks. The image combination module may be configured to generate a combined image based on the target images.

In some embodiments, the system may further include a calibration module. The calibration module may be configured to obtain the block position information associated with each of the plurality of imaging sensors by: retrieving a plurality of calibration source images generated by the plurality of imaging sensors; generating, based on the plurality of calibration source images, a plurality of calibration target images; and for each of the plurality of imaging sensors, performing a process as following. The process may include: dividing the corresponding calibration target image into a plurality of calibration target image blocks; for each of the plurality of calibration target image blocks, identifying an image region in the calibration source image including pixels for generating the calibration target image block as a corresponding calibration source image block; and obtaining the block position information associated with the imaging sensor indicating positions of the calibration source image blocks in the corresponding calibration source image.

In some embodiments, the image obtaining module may be configured further to store the plurality of source images into a first storage device. To retrieve the plurality of source image blocks in the source image according to the block position information, the processing module may be configured to transmit, via a burst transmission protocol, according to the block position information associated with the corresponding imaging sensor, an ith source image block from the first storage device to a second storage device, wherein i is an integer between 1 and the total number of the source image blocks. Data of the ith source image block for generating an ith target image block may be retrieved from the second storage device.

According yet to another aspect of the present disclosure, a non-transitory computer readable medium including instructions compatible for image processing is provided. When executed by at least one processor of an electronic device, the instructions may direct the at least one processor to execute an image processing process described in the present disclosure.

Additional features will be set forth in part in the description which follows, and in part will become apparent to those skilled in the art upon examination of the following and the accompanying drawings or may be learned by production or operation of the examples. The features of the present disclosure may be realized and attained by practice or use of various aspects of the methodologies, instrumentalities and combinations set forth in the detailed examples discussed below.

BRIEF DESCRIPTIONS OF THE DRAWINGS

The present disclosure is further described in terms of exemplary embodiments. These exemplary embodiments are described in detail with reference to the drawings. These embodiments are non-limiting exemplary embodiments, in which like reference numerals represent similar structures throughout the several views of the drawings, and wherein:

FIG. 5 is a flowchart illustrating an exemplary process for processing a source image to generate a target image according to some embodiments of the present disclosure;

FIG. 8 is a flowchart illustrating an exemplary process for obtaining, based a calibration source image and a calibration target image, block position information associated with the corresponding imaging sensor according to some embodiments of the present disclosure;

FIG. 11 is a flowchart illustrating an exemplary process for generating a panorama according to some embodiments of the present disclosure;

Figure 13:
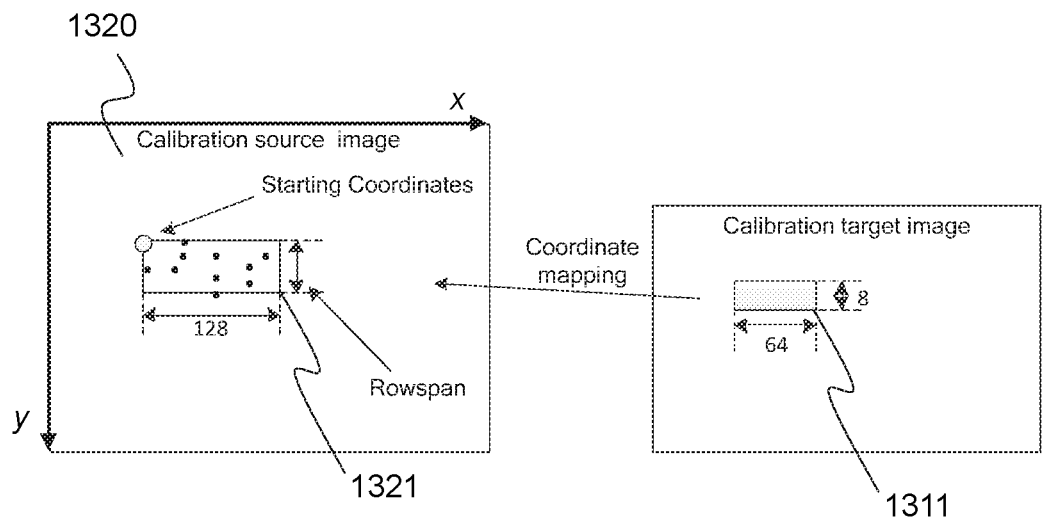
Figure 14:
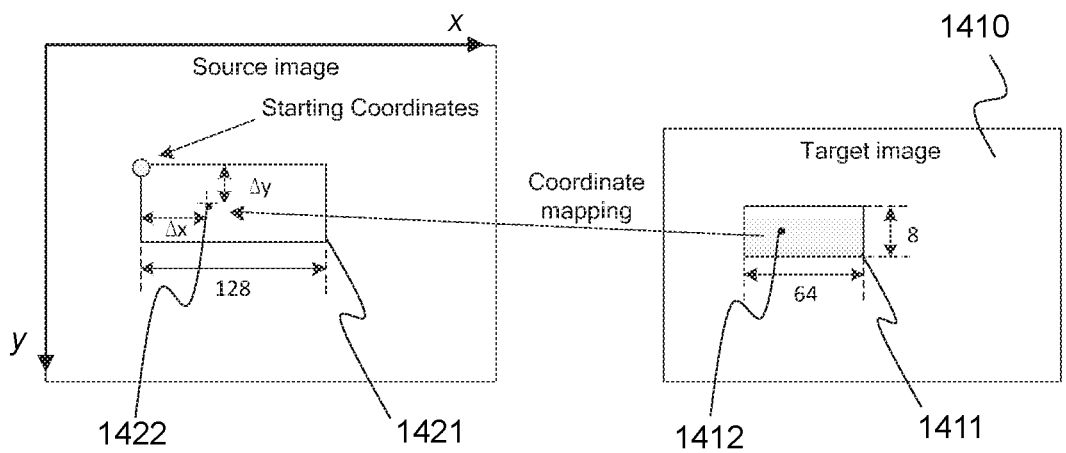

FIG. 13 is a schematic diagram illustrating an exemplary determination of a calibration source image block mapping to a calibration target image block according to some embodiments of the present disclosure; and FIG. 14 is a schematic diagram illustrating an exemplary retrieving of data of a source pixel mapping to a target pixel to be generated according to some embodiments of the present disclosure.

DETAILED DESCRIPTION

The present disclosure relates to methods and systems for generating a combined image such as a panorama. The panorama may be obtained by combining a plurality of target images. Each of the plurality of target images may be obtained by processing a corresponding source image block by block. To process the source image, image blocks (or be referred to as source image blocks) of the source image may be retrieved from a first storage device (e.g., a double data rate (DDR) storage device) according to block position information associated with an imaging sensor that generates the source image. The block position information may indicate the positions of the source image blocks in the source image. Each of the source image blocks may then be processed to generate a corresponding target image block. The generated target image blocks may each be a part of the target image to be generated and be combined to form the target image. The obtained target images may then be combined to form a panorama. In some embodiments, the above source images may be frames of different video streams, and the above process may be repeated to generate a panoramic video stream.

In the following detailed description, numerous specific details are set forth by way of examples in order to provide a thorough understanding of the relevant disclosure. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure. Various modifications to the disclosed embodiments will be readily apparent to those skilled in the art, and the general principles defined herein may be applied to other embodiments and applications without departing from the spirit and scope of the present disclosure. Thus, the present disclosure is not limited to the embodiments shown, but to be accorded the widest scope consistent with the claims.

The terminology used herein is for the purpose of describing particular example embodiments only and is not intended to be limiting. As used herein, the singular forms "a," "an," and "the" may be intended to include the plural forms as well, unless the context clearly indicates otherwise. It will be further understood that the terms "comprise," "comprises," and/or "comprising," "include," "includes," and/or "including," when used in this specification, specify the presence of stated features, integers, steps, operations, elements, and/or components, but do not preclude the presence or addition of one or more other features, integers, steps, operations, elements, components, and/or groups thereof.

It will be understood that the term "system," "unit," "module," and/or "block" used herein are one method to distinguish different components, elements, parts, section or assembly of different level in ascending order. However, the terms may be displaced by another expression if they achieve the same purpose.

Figure 2:
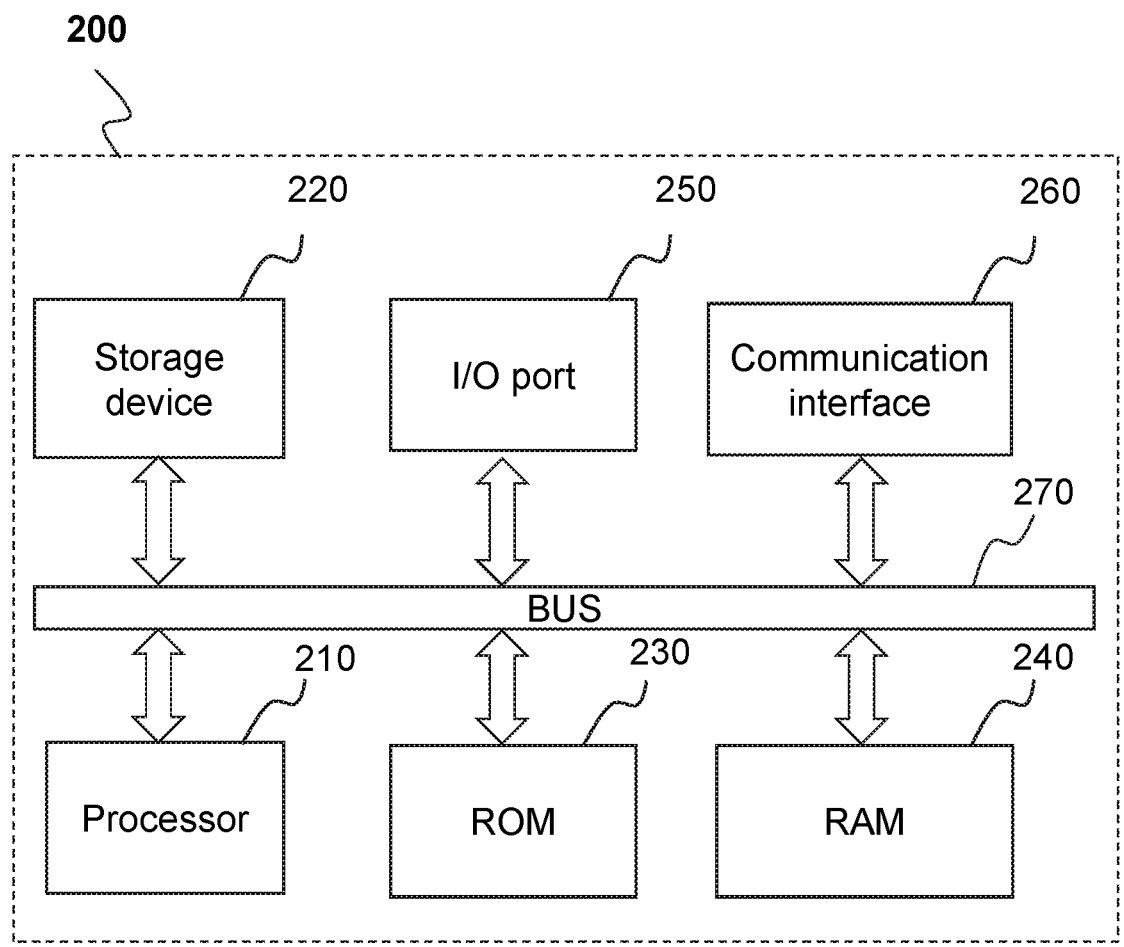
FIG. 2 is a schematic diagram illustrating an exemplary computing device.

Generally, the word "module," "sub-module," "unit," or "block," as used herein, refers to logic embodied in hardware or firmware, or to a collection of software instructions. A module, a unit, or a block described herein may be implemented as software and/or hardware and may be stored in any type of non-transitory computer-readable medium or another storage device. In some embodiments, a software module/unit/block may be compiled and linked into an executable program. It will be appreciated that software modules can be callable from other modules/units/blocks or from themselves, and/or may be invoked in response to detected events or interrupts. Software modules/units/blocks configured for execution on computing devices or logical circuits (e.g., processor 210 as illustrated in FIG. 2) may be provided on a computer-readable medium, such as a compact disc, a digital video disc, a flash drive, a magnetic disc, or any other tangible medium, or as a digital download (and can be originally stored in a compressed or installable format that needs installation, decompression, or decryption prior to execution). Such software code may be stored, partially or fully, on a storage device of the executing computing device, for execution by the computing device. Software instructions may be embedded in a firmware, such as an EPROM. It will be further appreciated that hardware modules/units/blocks may be included in connected logic components, such as gates and flip-flops, and/or can be included of programmable units, such as programmable gate arrays or processors. The modules/units/blocks or computing device functionality described herein may be implemented as software modules/units/blocks, but may be represented in hardware or firmware. In general, the modules/units/blocks described herein refer to logical modules/units/blocks that may be combined with other modules/units/blocks or divided into sub-modules/sub-units/sub-blocks despite their physical organization or storage. The description may be applicable to a system, an engine, or a portion thereof.

It will be understood that when a unit, engine, module or block is referred to as being "on," "connected to," or "coupled to," another unit, engine, module, or block, it may be directly on, connected or coupled to, or communicate with the other unit, engine, module, or block, or an intervening unit, engine, module, or block may be present, unless the context clearly indicates otherwise. As used herein, the term "and/or" includes any and all combinations of one or more of the associated listed items.

These and other features, and characteristics of the present disclosure, as well as the methods of operation and functions of the related elements of structure and the combination of parts and economies of manufacture, may become more apparent upon consideration of the following description with reference to the accompanying drawings, all of which form a part of this disclosure. It is to be expressly understood, however, that the drawings are for the purpose of illustration and description only and are not intended to limit the scope of the present disclosure.

Figure 1:
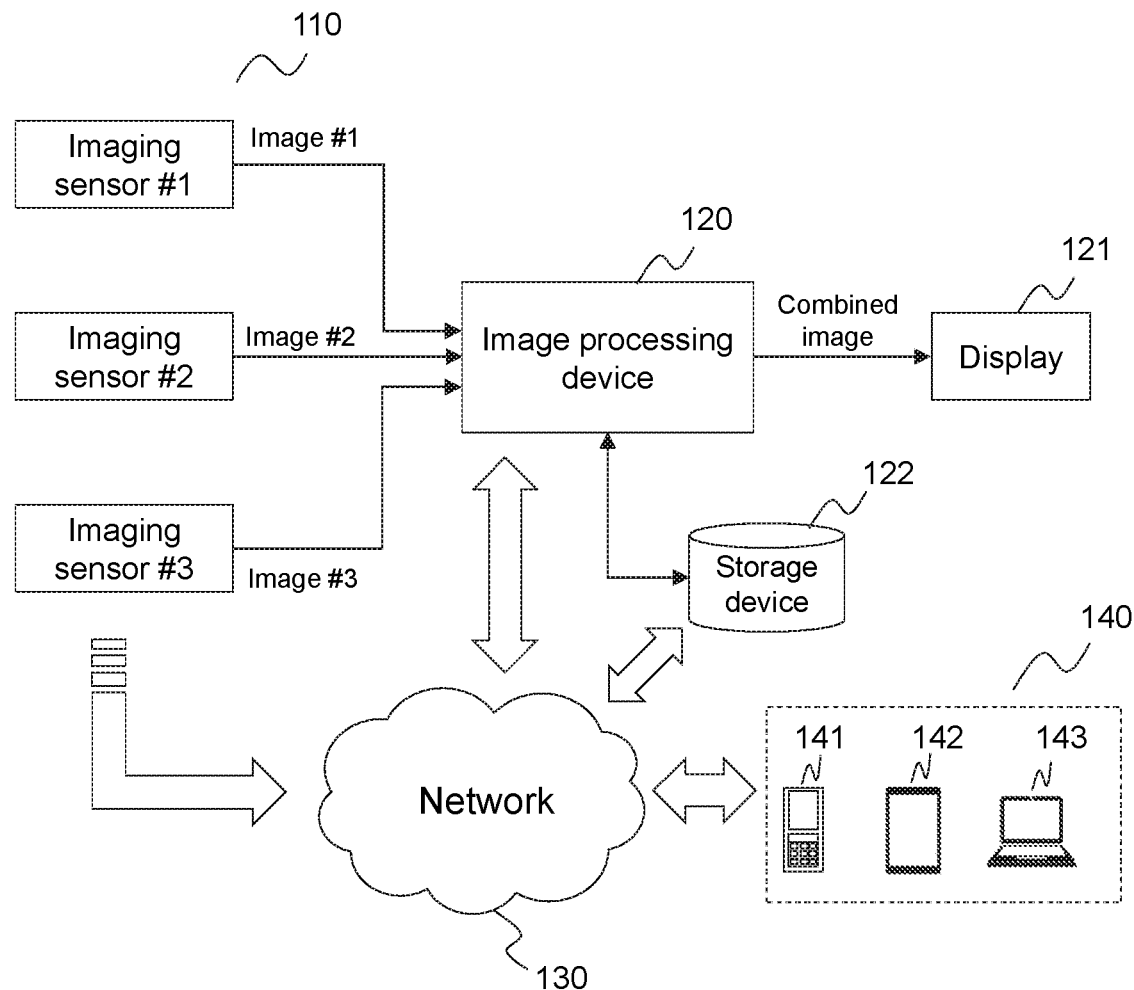
FIG. 1 is a schematic diagram illustrating an exemplary imaging system 100 according to some embodiments of the present disclosure.

FIG. 1 is a schematic diagram illustrating an exemplary imaging system 100 according to some embodiments of the present disclosure. The imaging system 100 may be configured to generate a combined image formed by a plurality of images. The combined image may illustrate the contents of the plurality of images simultaneously. For example, the combined image may be a panorama, a stereogram, a medical image with extended FOV, or the like, or a combination thereof.

The imaging system 100 may include a plurality of imaging sensors 110, an image processing device 120, a network 130, one or more terminal devices 140, and a storage device 150. The imaging system 100 may further include other components according to actual needs.

The plurality of imaging sensors 110 (e.g., imaging sensors #1, #2, and #3 illustrated in FIG. 1) may each generate an image. As used herein, an image may be a photo, a video, a frame of a video, a picture, a spectrum, or the like, or a combination thereof. The image may be of or presented in an analog form (e.g., an electric signal carrying the image data) or a digital form (e.g., a digital file including the image data). The plurality of imaging sensors 110 may sense light, waves, radiations, etc., to generate corresponding images.

The number of the imaging sensors 110 may be set according to actual needs. For example, when the combined image to be generated by the imaging system 100 is a stereogram, the number of the imaging sensors 110 may be two. When the combined image to be generated by the imaging system 100 is a panorama, the number of the imaging sensors 110 may be two or more, such as three.

In some embodiments, the plurality of imaging sensors 110 may each be included in a standalone imaging device, such as a camera, a radar, a sonar, a night vision device, a thermal imaging device, a medical imaging device, or the like, or a combination thereof. For example, the plurality of imaging sensors 110 may form a multi-channel camera system.

In some embodiments, some or all of the plurality of imaging sensors 110 may be included into a same imaging device. For example, the imaging sensors #1, #2, and #3 illustrated in FIG. 1 may be imaging sensors of a multi-lens multi-sensor camera (or be referred to as a multi-lens camera for short).

The image processing device 120 may generate a combined image by processing the images (or be referred to as source images, e.g., images #1 to #3) generated by the plurality of imaging sensors 110. The image processing device 120 may obtain a plurality of source images generated by the plurality of imaging sensors 110, and process each of the plurality of source images to generate a target image. The image processing device 120 may then generate a combined image based on the generated target images. Detailed descriptions for generating the combined image may be found elsewhere in the present disclosure (e.g., in connection with FIGS. 4 to 6).

To generate the target images, the image processing device 120 may process each of the plurality of source images by: retrieving a plurality of source image blocks from the source image according to block position information associated with the corresponding imaging sensor; generating, for each of the plurality of source image blocks, a target image block based on the source image block; and forming a corresponding target image based on the generated target image blocks. The block position information may indicate the positions of the source image blocks in the source image, and/or the storage positions (e.g., denoted in the form of a plurality of addresses or address ranges) of the source image blocks in a storage device (e.g., the storage device 122) that stores the source image.

In some embodiments, the image processing device 120 may be implemented by a computing device as illustrated in FIG. 2.

The image processing device 120 may be in communication with a storage device 122 via one or more cables or the network 130. The storage device 122 may store or buffer the images generated by the plurality of imaging sensors 110 before the images being processed by the image processing device 120 to generate combined images. In some embodiments, the generated combined images may also be stored or buffered in the storage device 122 before being outputted to, for example, a display 121 for displaying, or the network 130 for transmitting. In some embodiments, the imaging system 100 may include multiple storage devices 122. For example, the imaging system 100 may include three storage devices 122 for storing or buffering the images generated by the imaging sensors #1, #2, and #3, respectively, and one storage device 122 for storing or buffering the combined image generated by the image processing device 120.

The storage device 122 may be or may include a server, a mass storage, a removable storage, a volatile read-and-write memory, a read-only memory (ROM), a random-access memory (RAM), or the like, or any combination thereof. Exemplary mass storage may include a magnetic disk, an optical disk, a solid-state drive, etc. Exemplary removable storage may include a flash drive, a floppy disk, an optical disk, a memory card, a zip disk, a magnetic tape, etc. Exemplary volatile read-and-write memory may include a random access memory (RAM). Exemplary RAM may include a dynamic RAM (DRAM), a double date rate synchronous dynamic RAM (DDR SDRAM), a static RAM (SRAM), a thyrisor RAM (T-RAM), and a zero-capacitor RAM (Z-RAM), etc. Exemplary ROM may include a mask ROM (MROM), a programmable ROM (PROM), an erasable programmable ROM (EPROM), an electrically-erasable programmable ROM (EEPROM), a compact disk ROM (CD-ROM), and a digital versatile disk ROM, etc.

In some embodiments, the storage device 122 may transfer data to the image processing device 120 using a burst transmission protocol. As used herein, a burst transmission protocol may refer to transmitting data stored in continuous storage units of the storage device 122 repeatedly without going through all the steps required to transmit each piece of data in a separate transmission.

For instance, without using a burst transmission protocol, to transmit each piece of data, the storage device 122 may first locate the storage unit that stores the piece of data and then access the piece of data stored therein. The locating of a storage unit may cost a number of clock cycles (e.g., 2, 3), which may cause a delay in the data transmission. By utilizing a burst transmission protocol, the storage device 122 may only have to locate the storage unit that stores the starting piece of data to be transmitted, transmit the starting piece of data, and then automatically transmit the piece of data stored in the storage unit next to the current storage unit repeatedly without locating it, until a predetermined number (burst length) of the storage units have been accessed. As a result, the time cost for transferring data stored in continuous storage units may be reduced. For example, when a locating of a storage unit costs 3 clock cycles, a transmission of a piece of data stored in a storage unit cost 1 clock cycle, to transfer data stored in 4 continuous storage units, without using the above burst transmission protocol, a total of 16 clock cycles may be cost (4 clock cycles for transferring each piece of data). However, in the above case, when the burst transmission protocol is adopted (with a burst length above 4), a total of 7 clock cycles may be cost (3 clock cycles for locating the storage unit that stores the starting piece of data, and 1 clock cycle for transferring each piece of data).

Normally, an image (or source image) received from any one of the plurality of imaging sensors 110 or each part thereof may be stored in continuous storage units of the storage device 122. Such a storing manner of an image may be referred to as a continuity of an image. By utilizing a burst transmission protocol, time cost for transmitting the plurality of portions of the image (also referred to as "image blocks") to the image processing device 120 may be reduced.

It is understood that, the above burst transmission protocol is only for demonstration purpose and not intended to be limiting. Different types of the storage device 122 may adopt different type of the burst transmission protocol. In some embodiments, the storage device 122 may be a double data rate (DDR) memory, such as a DDR synchronous dynamic random-access memory (SDRAM), a low power DDR SDRAM (LP-DDR).

In some embodiments, the storage device 122 may also be configured to store instructions (e.g., in the form of a software, an application, a program) to be executed by the image processing device 120 (or one or more processor thereof). The instructions, when executed by the image processing device 120, may cause the image processing device 120 to perform the processes disclosed in the present disclosure related to the generation of a combined image.

The image processing device 120 may receive images (e.g., source images) generated by the plurality of imaging sensors 110 via one or more cables or the network 130. In some embodiments, the plurality of imaging sensors 110 and the image processing device 120 may form a multi-channel camera system. In some embodiments, the plurality of imaging sensors 110 and the image processing device 120 may be combined to form a single device, such as a multi-lens camera with the function of processing image data.

The network 130 may include any suitable network that may facilitate a transmission of data and signals between the components of image processing system 100. For example, the network 130 may facilitate a transmission of image from the plurality of imaging sensors 110 to the image processing device 120 (or the storage device 122).

The network 130 may be and/or include one or more types of networks. For example, the network 130 may be and/or include a public network (e.g., the Internet), a private network (e.g., a local area network (LAN), a wide area network (WAN)), a wired network (e.g., an Ethernet network), a wireless network (e.g., an 802.11 network, a Wi-Fi network), a cellular network (e.g., a Long Term Evolution (LTE) network), a frame relay network, a virtual private network ("VPN"), a satellite network, a Bluetooth™ network, a ZigBee™ network, a near field communication (NFC) network, or the like, or any combination thereof. The network 130 may also include wired and/or wireless network access points, such as base stations, internet exchange points, routers, hubs, gateways, switches, server computers, and/or any combination thereof.

The terminal device 140 may receive images or videos from the plurality of imaging sensors 110, the image processing device 120, and/or the storage device 122 via the network 130. In some embodiments, the terminal device 140 may also provide a user interface for a user to control the plurality of imaging sensors 110 and/or the image processing device 120.

The terminal device 140 may include a mobile computing device 141, a tablet computer 142, a laptop computer 143, a smart home device (not shown), a desktop computer (now shown) or the like, or any combination thereof. In some embodiments, the mobile computing device 141 may include a wearable device, a mobile phone, a virtual reality device, an augmented reality device, a personal digital assistance (PDA), a navigation device, or the like, or any combination thereof.

In some embodiments, the imaging system 100 may implement a surveillance system. The source images generated by the plurality of imaging sensors 110 may be in the form of video streams. The combined image generated by the image processing device 120 may be a panoramic video stream. The process provided in the present disclosure may reduce the time cost for generating the panoramic video stream and improve the real-time performance, so as to fulfill the requirement for providing a surveillance service. The imaging system 100 may also be adopt in other related fields, such as photography, movie production, journalism, medical imaging, etc. For demonstration purposes and not intended to be limiting, the present disclosure may be described by way of example that the combined image generated by the image processing device 120 is a panorama or a panoramic video stream.

In some embodiments, the imaging system 100 may only include one movable imaging sensor for generating the combined image. The movable imaging sensor may move along a preset moving trajectory, and capture an image at each preset shooting location along the preset moving trajectory. The obtained images may serve as the source images for generating the combined image, such as a panorama.

In some embodiments, each preset shooting location along the preset moving trajectory may be associated with one or more preset imaging parameter, such as a shooting angle. When the movable imaging sensor moves to a preset shooting location, the imaging sensor may adopt the one or more preset imaging parameters associated with the preset shooting location to capture the corresponding source image.

For demonstration purposes, the present disclosure may be described on the premise that the source images for generating a combined image are generate by a preset number of imaging sensors. However, it is understood that, the source images may also be generated by a reduced number of imaging sensors (including one or more movable imaging sensor), or even only one movable imaging sensor.

It is noted that above descriptions about the imaging system 100 are merely for illustration purposes, and not intended to limit the scope of the present disclosure. It is understood that, after learning the major concept and the mechanism of the present disclosure, a person of ordinary skills in the art may alter the imaging system 100 in an uncreative manner. The alteration may include combining and/or splitting certain devices/components/modules/units, adding or removing optional devices/components/modules/units, changing the connection state of the devices/components/modules/units, applying the imaging system 100 in a relative field, or the like, or any combination thereof. All such modifications are within the scope of the present disclosure.

FIG. 2 is a schematic diagram illustrating an exemplary computing device. Computing device 200 may be configured to implement the image processing device 120, and perform one or more operations disclosed in the present disclosure. The computing device 200 may be configured to implement various modules, units, and their functionalities described in the present disclosure.

The computing device 200 may include a bus 270, a processor 210 (or a plurality of processors 210), a read only memory (ROM) 230, a random access memory (RAM) 240, a storage device 220 (e.g., massive storage device such as a hard disk, an optical disk, a solid-state disk, a memory card, etc.), an input/output (I/O) port 250, and a communication interface 260. It may be noted that, the architecture of the computing device 200 illustrated in FIG. 2 is only for demonstration purposes, and not intended to be limiting. The computing device 200 may be any device capable of performing a computation.

The bus 270 may couple various components of computing device 200 and facilitate transferring of data and/or information between them. The bus 270 may have any bus structure in the art. For example, the bus 270 may be or may include a memory bus and/or a peripheral bus. The I/O port 250 may allow a transferring of data and/or information between the bus 270 and one or more other devices (e.g., a touch screen, a keyboard, a mouse, a microphone, a display, a speaker). The communication interface 260 may allow a transferring of data and/or information between the network 130 and the bus 270. For example, the communication interface 260 may be or may include a network interface card (NIC), a Bluetooth™ module, an NFC module, etc.

In some embodiments, via at least one of the I/O port 250 and the communication interface 260, the computing device 200 may receive source images from the plurality of imaging sensors 110 and/or output the generated combined image.

The ROM 230, the RAM 240, and/or the storage device 220 may be configured to store instructions that may be executed by the processor 210. The RAM 240, and/or the storage device 220 may also store data and/or information generated by the processor 210 during the execution of the instruction. In some embodiments, at least one of the ROM 230, the RAM 240, or the storage device 220 may implement the storage device 122 illustrated in FIG. 1.

The processor 210 may be or include any processor in the art configured to execute instructions stored in the ROM 230, the RAM 240, and/or the storage device 220, so as to perform one or more operations or implement one or more modules/units disclosed in the present disclosure. Merely by way of example, the processor 210 may include one or more hardware processors, such as a central processing unit (CPU), an application-specific integrated circuit (ASIC), an application-specific instruction-set processor (ASIP), a graphics processing unit (GPU), a physics processing unit (PPU), a digital signal processor (DSP), a field-programmable gate array (FPGA), a programmable logic device (PLD), a controller, a microcontroller unit, a reduced instruction-set computer (RISC), a microprocessor, or the like, or any combination thereof.

In some embodiments, the computing device 200 may include a plurality of processors 210. The plurality of processors 210 may operate in parallel for performing one or more operations disclosed in the present disclosure.

In some embodiments, one or more of the components of the computing device 200 may be implemented on a single chip. For example, the processor 210, the ROM 230, and the RAM 240 may be integrated into a single chip.

In some embodiments, the computing device 200 may be a single device or include a plurality of computing devices having a same or similar architecture as illustrated in FIG. 2. In some embodiments, the computing device 200 may implement a personal computer (PC) or any other type of work station or terminal device. The computing device 200 may also act as a server if appropriately programmed.

Figure 3:
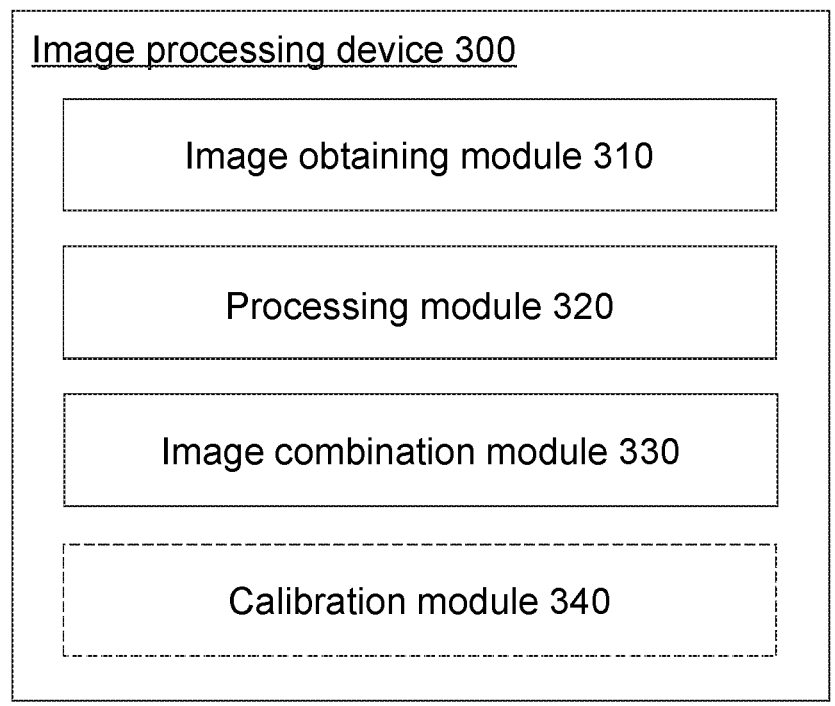
FIG. 3 illustrates an exemplary image processing device according to some embodiments of the present disclosure.

FIG. 3 illustrates an exemplary image processing device 300 according to some embodiments of the present disclosure. The image processing device 300 may be an example of the image processing device 120 (illustrated in FIG. 1) for generating a combined image (e.g., a panorama). The image processing device 300 may include an image obtaining module 310, a processing module 320, an image combination module 330, and a calibration module 340 (optional).

The image obtaining module 310 may be configured to obtain a plurality of source images generated by a plurality of imaging sensors (e.g., the plurality of imaging sensors 110). In some embodiments, the obtained plurality of source images may be buffered in a first storage device (e.g., the storage device 122, the storage device 200, the RAM 240).

The processing module 310 may be configured to process the plurality of source images to generate corresponding target images. In some embodiments, the processing module 310 may process each of the plurality of source images by: retrieving (e.g., from the first storage device) a plurality of source image blocks from a source image of the plurality of source images according to block position information associated with the corresponding imaging sensor; generating, for each of the plurality of source image blocks, a target image block based on the source image block; and forming a corresponding target image based on the generated target image blocks.

In some embodiments, the processing module 310 may process the plurality of source images in parallel. For example, the processing module 310 may be implemented by a plurality of processors 210. Each processor 210 may process a corresponding source image to generate a corresponding target image via, for example, the above process.

The image combination module 330 may be configured to generate a combined image based on the target images generated by the processing module 310. In some embodiments, the combined image may be a panorama.

In some embodiments, a source image may be a frame of a video stream generated by the corresponding imaging sensor. Correspondingly, the generated combined image may also serve as a corresponding frame of a video stream to be outputted by the image processing device 300.

The calibration module 340 may be configured to generate the block position information associated with the corresponding imaging sensor. In some embodiments, when two or more source images are generated by a movable imaging sensor at a preset number of shooting locations. The calibration module 340 may be configured to generate the block position information associated with each of the preset shooting locations. For demonstration purposes and simplicity, in the present disclosure, a movable imaging sensor having two or more preset shooting locations for generating the source images may be treated as a corresponding number of imaging sensors each having a preset shooting location.

In some embodiments, one or more imaging parameters (e.g. a shooting angle, a location of the imaging sensor, a focal length, an FOV) for an imaging sensor to capture or generate the corresponding source image may be changed purposely or by accident. In response to such a change, the calibration module 340 may at least update the block position information associated with the changed imaging sensor. In some embodiments, the calibration module 340 may further update the block position information associated with imaging sensors adjacent to the changed imaging sensor or all the imaging sensors of the plurality of imaging sensors.

The functions and operations of the modules of the image processing device 300 may be further described in connection with FIGS. 4 to 8.

It is understood that, the division of the modules of the image processing device 300 is merely based on a logical delineation. Other division formats may also be adopted and the image processing device 300 may take other forms (e.g., the panorama device 1000 illustrated in FIG. 10).

It is noted that, the above descriptions about the image processing device 300 are only for illustration purposes, and not intended to limit the present disclosure. It is understood that, after learning the major concept and the mechanism of the present disclosure, a person of ordinary skill in the art may alter the image processing device 300 in an uncreative manner. The alteration may include combining and/or splitting modules, adding or removing optional modules, etc. All such modifications are within the protection scope of the present disclosure.

Figure 4:
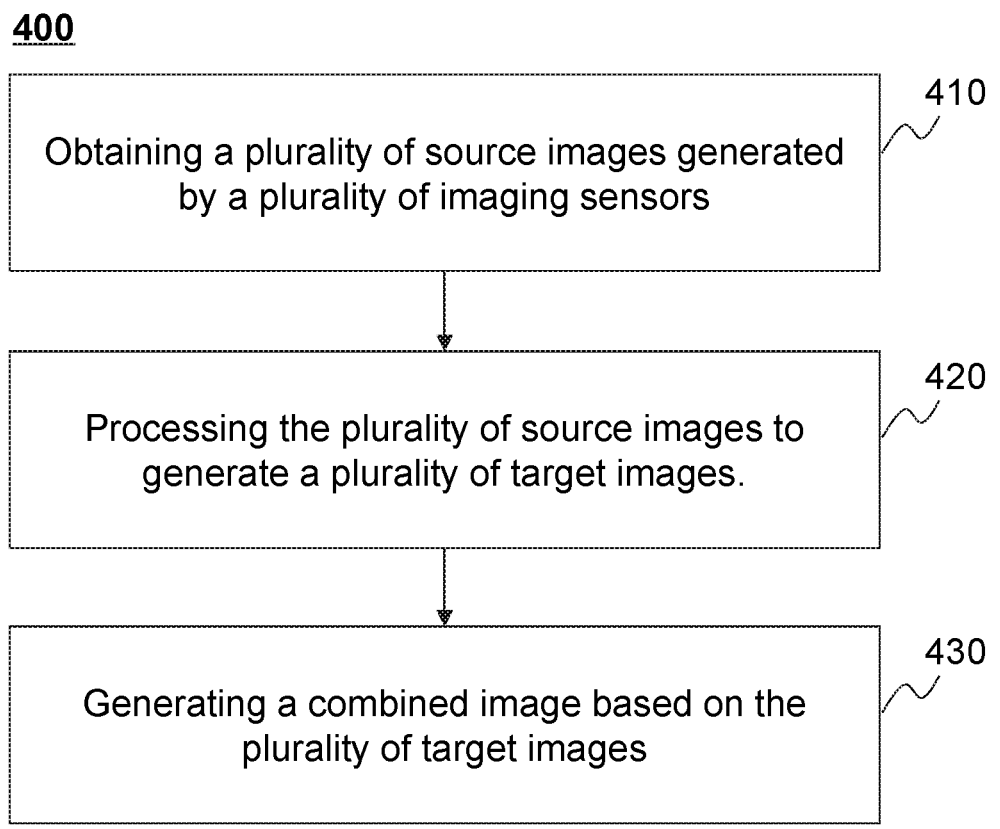
FIG. 4 is a flowchart illustrating an exemplary process for generating a combined image according to some embodiments of the present disclosure.

FIG. 4 is a flowchart illustrating an exemplary process 400 for generating a combined image according to some embodiments of the present disclosure. The process 400 may be implemented by the image processing device 300 for generating a combined image, such as a panorama or a stereogram. In some embodiments, the process 400 illustrated in FIG. 4 may be implemented in the imaging system 100 illustrated in FIG. 1 (e.g., by the image processing device 120). For example, the process 400 illustrated in FIG. 4 may be stored in a storage device (e.g., the storage device 122, the storage device 220, the ROM 230, the RAM 240) in the form of instructions, and invoked and/or executed by one or more processors (e.g., the processor 210) of the image processing device 120.

In 410, the image obtaining module 310 may obtain a plurality of source images generated by a plurality of imaging sensors. The image obtaining module 310 may store or buffer the plurality of source images into a first storage device (e.g., the storage device 122, the storage device 220, the RAM 240). Each of the plurality of source images or at least each part thereof may be stored in continuous storage units to facilitate retrieving data of the source image for the subsequent image processing.

The number of the plurality of source images may not necessarily the same as the number of the plurality of imaging sensors. In some embodiments, each of the plurality of imaging sensors may generate a source image to be used for generating the combined image. In some embodiments, only a part of the plurality of imaging sensors may be used for generating the source images, and the other part of the plurality of imaging sensors may be turned off, standby, or for generating one or more images for other use, etc. In some embodiments, the plurality of imaging sensors may be replaced by one or more movable imaging sensors with a plurality of preset shooting locations.

In 420, the processing module 310 may be configured to process the plurality of source images to generate corresponding target images. Each of the target images may be a portion of the combined image to be generated. In some embodiments, the processing module 310 may process the plurality of source images in parallel to improve the efficiency for generating the target images. For example, the processing module 310 may be implemented by a plurality of processors 210 (or a plurality of processing cores of the processor 210). Each processor 210 (or each core thereof) may process a source image to generate a corresponding target image via, for example, the above process.

For illustration purpose, the processing module 310 may process each of the plurality of source images via a process illustrated in FIG. 5.

FIG. 5 is a flowchart illustrating an exemplary process 500 for processing a source image to generate a target image according to some embodiments of the present disclosure. The process 500 may be performed by the image processing device 300. In some embodiments, by repeating the process 500, the operation 420 illustrated in FIG. 4 may be achieved. In some embodiments, the process 500 illustrated in FIG. 5 may be implemented in the imaging system 100 illustrated in FIG. 1 (e.g., by the image processing device 120). For example, the process 500 illustrated in FIG. 5 may be stored in a storage device (e.g., the storage device 122, the storage device 220, the ROM 230, the RAM 240) in the form of instructions, and invoked and/or executed by one or more processors (e.g., the processor 210) of the image processing device 120.

In 510, the processing module 320 may retrieve a plurality of source image blocks from the source image according to block position information associated with the corresponding imaging sensor.

In 520, the processing module 320 may generate, for each of the plurality of source image blocks, a target image block based on the source image block.

In 530, the processing module 320 may form a corresponding target image based on the generated target image blocks.

Each of the generated target image blocks may be a part of the combined image to be generated, and all the target image blocks may together contained all the image information of the combined image. Each of the plurality of source image block may be a part of the source image and include all the necessary pixels for generating a corresponding target image block. The target image blocks and the source image blocks may be preferably rectangular, but may also have any other proper shape (e.g., circular, hexagonal, square, shapeless). According to actual needs, the plurality of source image blocks may have the same or different sizes and/or shapes.

The block position information may indicate the positions (e.g., denoted in the form of coordinates ranges) of the source image blocks in the source image, and/or the storage positions (e.g., denoted in the form of a plurality of addresses or address ranges) of the source image blocks in the first storage device (e.g., the storage device 122). For example, the block position information associated with one rectangular source image block may include the starting coordinates (e.g., the coordinates of the pixel at the top left corner), the length, and the width (or be referred to as rowspan) of the rectangular source image block. As another example, the block position information associated with one rectangular source image block may include the starting coordinates and the ending coordinates (e.g., the coordinates of the pixel at the bottom right corner). As a further example, the block position information associated with one rectangular source image block may include the storage position of the corresponding starting coordinates in the first storage device, the length, and the rowspan of the rectangular source image block. In the above examples, the coordinates and/or the storage positions of other pixels of the source image block may be deduced based on the given information. However, the block position information associated with one source image block may also be configured to include the coordinates and/or the storage positions of all the pixels of the source image block.

The obtained source image blocks may be transformed to the corresponding target image blocks according to a transformation function (or a set of transformation functions). The transformation function may be in accordance with the type of the combined image to be generated.

In the prior art, a target image may be generated pixel by pixel. Each time data of one or more pixels (or be referred to as source pixels) in the source image is to be used for computing data of a pixel (or be referred to as a target pixel) in the target image via the transformation function, the data of the one or more pixels may be directly retrieved from the storage device that stores the source image. Such a pixel-to-pixel (or be referred to as point-to-point) data retrieving approach may not benefit from a data transmission protocol that speeds up the transmission of data stored in continuous storage units, such as a burst transmission protocol. Besides, the storage device may also be used to buffer frames of one or more video streams as source images to be processed, the overall data throughput efficiency of the storage device may be reduced due to such a pixel-to-pixel data retrieving approach for generating the target image.

In the present disclosure, a target image may be generated block by block. Each time a source image block is to be processed for generating a target image block, the processing module 320 may transmit the whole source image block from the first storage device (e.g., an DDR storage device) to a second storage device (e.g., a cache, a RAM) of the image processing device 300 via a data transmission protocol such as a burst transmission protocol. Data of the source image block for generating the target image block may then be retrieved from the second storage device. Such a block-to-block data retrieving approach may improve the overall data throughput efficiency of the first storage device, especially when the first storage device is also used to buffer frames of one or more video streams as source images to be processed. A single target image block may still be generated pixel by pixel using the transformation function. For computing data of each target pixel in the target image block, the pixel-to-pixel data retrieving approach may be used to retrieve data of one or more source pixels from the second storage device. Therefore, the pixel-to-pixel data retrieving approach may not affect the data throughput efficiency of the first storage device. An exemplary implementation of the above process is described in connection with FIG. 6.

The image processing device 300 may include one or more second storage devices for processing source images generated by the plurality of imaging sensors. For example, the image processing device 300 may include a predetermined number (e.g., 1, 2, 3, 4) of second storage devices for each of the plurality of imaging sensors, and the predetermined number of second storage devices may be used only to process the source image generated by the corresponding imaging sensor. As another example, a second storage device of the image processing device 300 may be used to process source images generated by multiple imaging sensors. As a further example, the image processing device may include only one second storage device for processing all the source images.

Optionally, improvements may be made to further improve the efficiency for generating the target image blocks, so as to improve the total efficiency for generating the combined image. Exemplary embodiments are described as following.

In some embodiments, the second storage device may have a higher data transmission performance than the first storage device to improve the data transmission efficiency for processing the source image block. Optionally, the second storage device may have a lower storage capacity compared to the first storage device to reduce the cost.

In some embodiments, the processing module 320 may process a predetermined number of source image blocks of the same source image simultaneously with a corresponding number of processing cores (or processors) to further improve the efficiency for generating the target image blocks. Correspondingly, a same number of second storage devices may be in communication with the processing cores (or processors) for storing the corresponding source image blocks to be processed by the processing cores, respectively. For example, to obtain a target image, 1536 (or any other proper number) source image blocks may be processed. The processing module 320 may include 4 (or any other proper number) processing cores (or processors) for processing the 1536 source image blocks simultaneously, each of which may be in communication with at least one second storage device that stores the corresponding source image block retrieved from the first storage device, respectively.

In some embodiments, the block position information may be set or configured by the calibration module 340 according to the algorithm for generating the target image blocks and or the combined image (e.g., a stitching algorithm for generating a panorama), so that the generated target image blocks may each be a portion of the target image to be formed and may be presumed to have no overlapping regions. Consequently, the target image may be formed by directly splicing the resulting target image blocks in the operation 530 without obvious seams and additional cost of computation resources. An exemplary process for obtaining the block position information is described in connection with FIG. 7. The obtained block position information may be stored in the first storage device, the second storage device, or another storage device.

In some embodiments, one or more imaging sensors for generating the source images may be movable between two or more shooting locations. For such an imaging sensor, at different shooting locations, different preset block position information may be associated with the imaging sensor.

The block position information associated with an imaging sensor may be maintained the same for processing all the source images (or frames) generated by the imaging sensor, unless one or more imaging parameters (e.g., shooting angle, the location of the imaging sensor, on and off state) of the imaging sensor for generating the corresponding source image is changed, which may cause an inaccurate generation of the combined image. Such a change may be made by a user, occur by accident, or due to the aging of the hardware, etc.

In some embodiments, to ensure that the combined images are accurate or acceptable, the calibration unit 340 may detect whether a change is occurred periodically. Unless a change is detected, the same block position information may be used to process all the source images (e.g., in the form of consecutive video frames) generated by the corresponding imaging sensor. In some embodiments, the calibration unit 340 may also periodically update the block position information.

Figure 7:
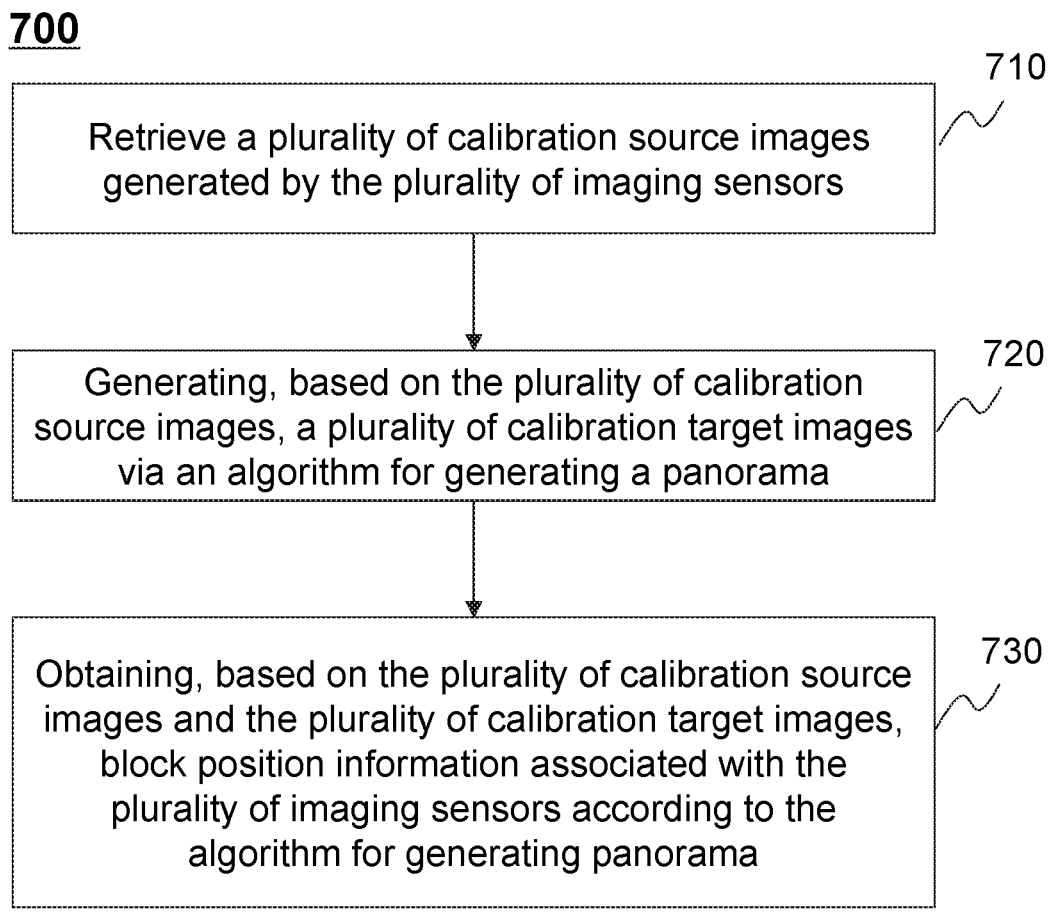
FIG. 7 is a flowchart illustrating an exemplary process for obtaining block position information associated with the plurality of imaging sensors according to some embodiments of the present disclosure.

In some embodiments, in response to a change of one or more imaging parameters of a specific imaging sensor (or be referred to as a target imaging sensor) of the plurality of imaging sensors, the calibration module 340 may trigger a re-obtaining of at least the block position information of the target imaging sensor via the process illustrated in FIG. 7. The change may be specified by a user (e.g., via the terminal device 140) or be detected in different embodiments of the present disclosure. The calibration module 340 may re-obtain the block position information only associated with the target imaging sensor, the block position information associated with the target imaging sensor and the imaging sensors adjacent to the target imaging sensor, or the block position information associated with all the plurality of imaging sensors.

In some embodiments, in response to an adding of an additional imaging sensor to the plurality of imaging sensors, the calibration module 340 may obtain the block position information of the additional imaging sensor via the process illustrated in FIG. 7. In some embodiments, the calibration module 340 may further re-obtain the block position information associated with the imaging sensors adjacent to the additional imaging sensor, or the block position information associated with all the plurality of imaging sensors.

In the operation 530, the processing module 320 may form the target image by, for example, splicing the generated target image blocks. The splicing may be performed according to a splicing pattern, which may be included in the block position information or be found elsewhere. The splicing pattern may indicate the positions of the target image blocks in the target image or the sequence for splicing the target image blocks. The formed target image may then be used for generating the combined image.

In some embodiments, the processing module 320 may construct a continuous storage region (e.g., based on the aforementioned splicing pattern) in a third storage device for storing the data of pixels of the target image to be formed. The third storage device may be the first storage device, the second storage device, or a storage device different from the first storage device or the second storage device. The continuous storage region may include continuous storage units, each of which may correspond to a target pixel of the target image to be formed. The processing module 320 may store the target image blocks into the continuous storage region. Thus, when the continuous storage region are accessed by, for example, the processing module 320, a target image formed by the target image blocks may be generated and displayed, if needed.

In some embodiments, in the operation 520, each time data of a target pixel of a target image block is computed, the processing module 320 may transmit the computed data to a corresponding storage unit in the continuous storage region for storage. After the operation 520 is completed, the generated target image blocks may be accordingly stored in the continuous storage region, and when accessed, may be naturally spliced to form a target image without any additional processing.

It is understood that, the processing module 320 may also independently store the plurality of target image blocks and use one or more additional operations to splice the plurality of target image blocks to form the target image. For example, the processing module 320 may also construct a continuous storage region for storing the data of pixels of the target image to be formed, e.g., in the first storage device. The processing module 320 may then transmit the generated target image blocks, e.g., in the third storage device (different from the first storage device), to the continuous storage region of the first storage device. After the transmission is completed, the target image blocks may form the target image that is continuously stored in the first storage device.

It is noted that the above descriptions of the process 500 are only for demonstration purposes, and not intended to be limiting. It is understandable that, after learning the major concept of the present disclosure, a person of ordinary skills in the art may alter the process 500 in an uncreative manner. For example, the operations above may be implemented in an order different from that illustrated in FIG. 5. One or more optional operations may be added to the flowcharts. One or more operations may be split or be combined. All such modifications are within the scope of the present disclosure.

Referring back to FIG. 4, in 430, the image combination module 330 may generate a combined image based on the plurality of target image. The operation 430 may be performed according to the specific type of the combined image. For example, the combined image may be a stereogram, and the plurality of target images (e.g., with a total number of two) may correspond to different perspectives. As another example, the combined image may be a panorama, and the plurality of target images may corresponding to different portions of the FOV of the panorama. As a further example, the combined image may be a medical image of a human body (or an organ), and the plurality of target images may be medical images of different parts of the human body (or the organ). For demonstration purpose, the following of the present disclosure may be described on the premise that the combined image is a panorama.

In different embodiments of the present disclosure, adjacent target images generated in the operation 520 may have overlapping parts or be presumed to have no overlapping parts.

In some embodiments, by properly setting or configuring the block position information associated with the plurality of imaging sensors, and/or the algorithm used for generating the target images, adjacent target images may be assumed to have no overlapping parts. Then the operation 430 may be similar to the operation 530. For example, the image combination module 330 may construct a continuous storage region in the first storage device for storing the data of pixels of the panorama to be generated. The continuous storage region may include continuous storage units, each of which may correspond to a pixel of the panorama to be generated. Then the image combination module 330 may transmit the plurality of target images from the third storage device (different from the first storage device) to the first storage device, to store the target images in the corresponding portion of the continuous storage region. After the transmission is completed, the target images may form a panorama that is continuously stored in the first storage device. As used herein, a panorama may be deemed as being formed if the target images forming the panorama are stored in a continuous storage region. Similarly, a target image may be deemed as being formed if the target image blocks forming the target image are stored in a continuous storage region. In some embodiments, the image combination module 330 may also transmit the target images via a burst data transmission protocol to improve the transmission efficiency.

In some embodiments, the operation 430, the operation 530, and the operation 520 may be combined. The processing module 320 and the imaging combination module 330 may also be combined as well. For example, before the operation 520, the processing module may directly construct the continuous storage region for storing the panorama in the first storage device, the second storage device, or the third storage device. In the operation 520, each time data of a target pixel of a target image block is computed, the processing module 320 may transmit the computed data to a corresponding storage unit in the continuous storage region for storage. After the operation 520 is completed, a panorama may be continuously stored and naturally formed without additional processing. When the continuous storage region is not constructed in the first storage device, the processing module 320 may transmit the target images to the first storage device to form the panorama, e.g., via a burst data transmission protocol.

In some embodiments, adjacent target images generated in the operation 520 may have overlapping parts. The image combination module 330 may generate a panorama by stitching the target images (e.g., stored in the second or third storage device). The stitching process may increase the accuracy of the generated panorama but decrease the speed for generating the panorama. The image combination module 330 may then transmit the panorama to the first storage device, e.g., via a burst transmission protocol.

Figure 9:
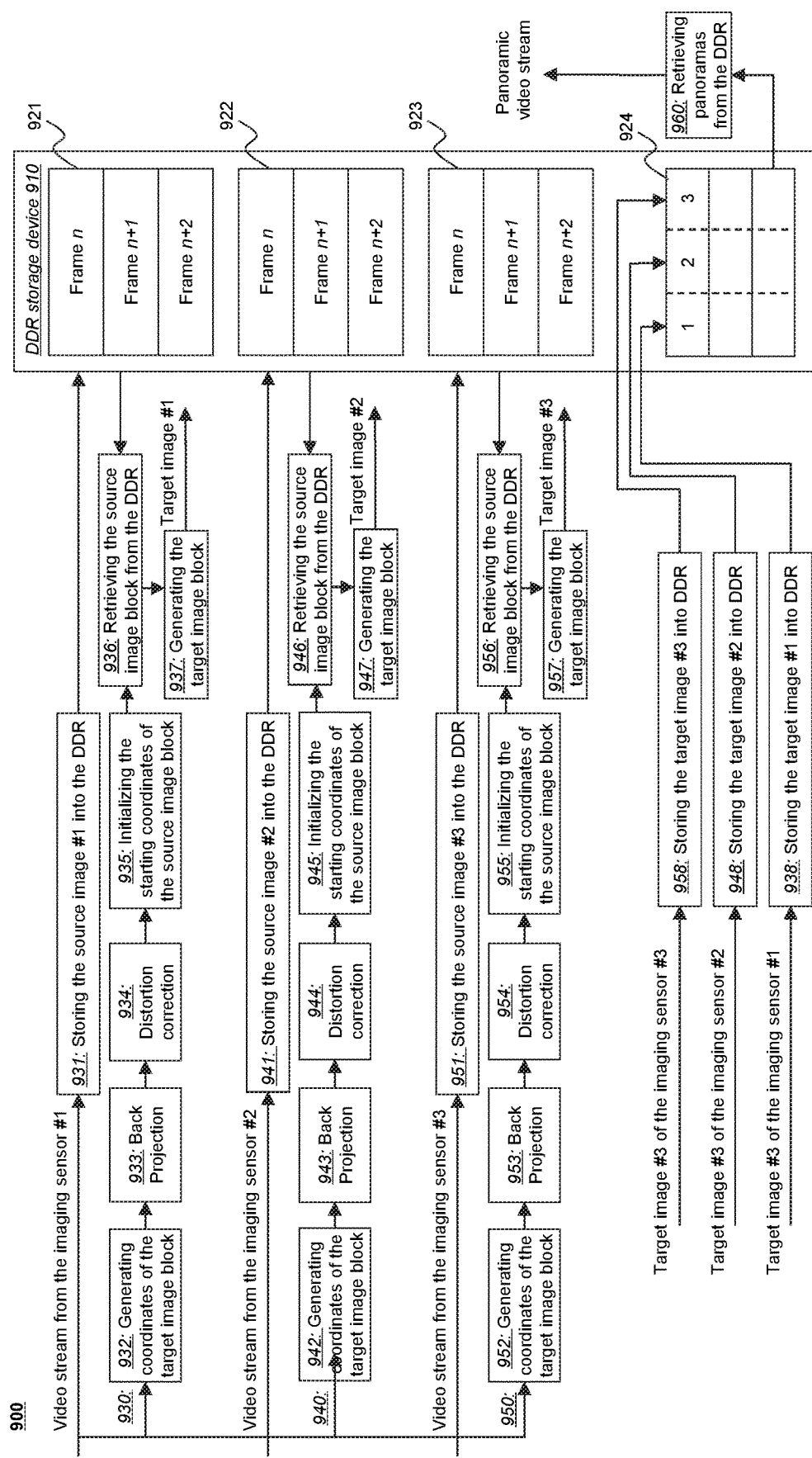
FIG. 9 is a schematic diagram illustrating an exemplary process for generating a panoramic video stream according to some embodiments of the present disclosure.

In some embodiments, a source image may be a frame of a video stream generated by the corresponding imaging sensor. Correspondingly, the generated combined image (e.g., panorama) may also serve as a corresponding frame of a video stream to be outputted by the image processing device 300. An exemplary process for generating a panoramic video is illustrated in FIG. 9.

It is noted that the above descriptions of the process 400 are only for demonstration purposes, and not intended to be limiting. It is understandable that, after learning the major concept of the present disclosure, a person of ordinary skills in the art may alter the process 400 in an uncreative manner. For example, the operations above may be implemented in an order different from that illustrated in FIG. 4. One or more optional operations may be added to the flowcharts. One or more operations may be split or be combined. All such modifications are within the scope of the present disclosure.

Figure 6:
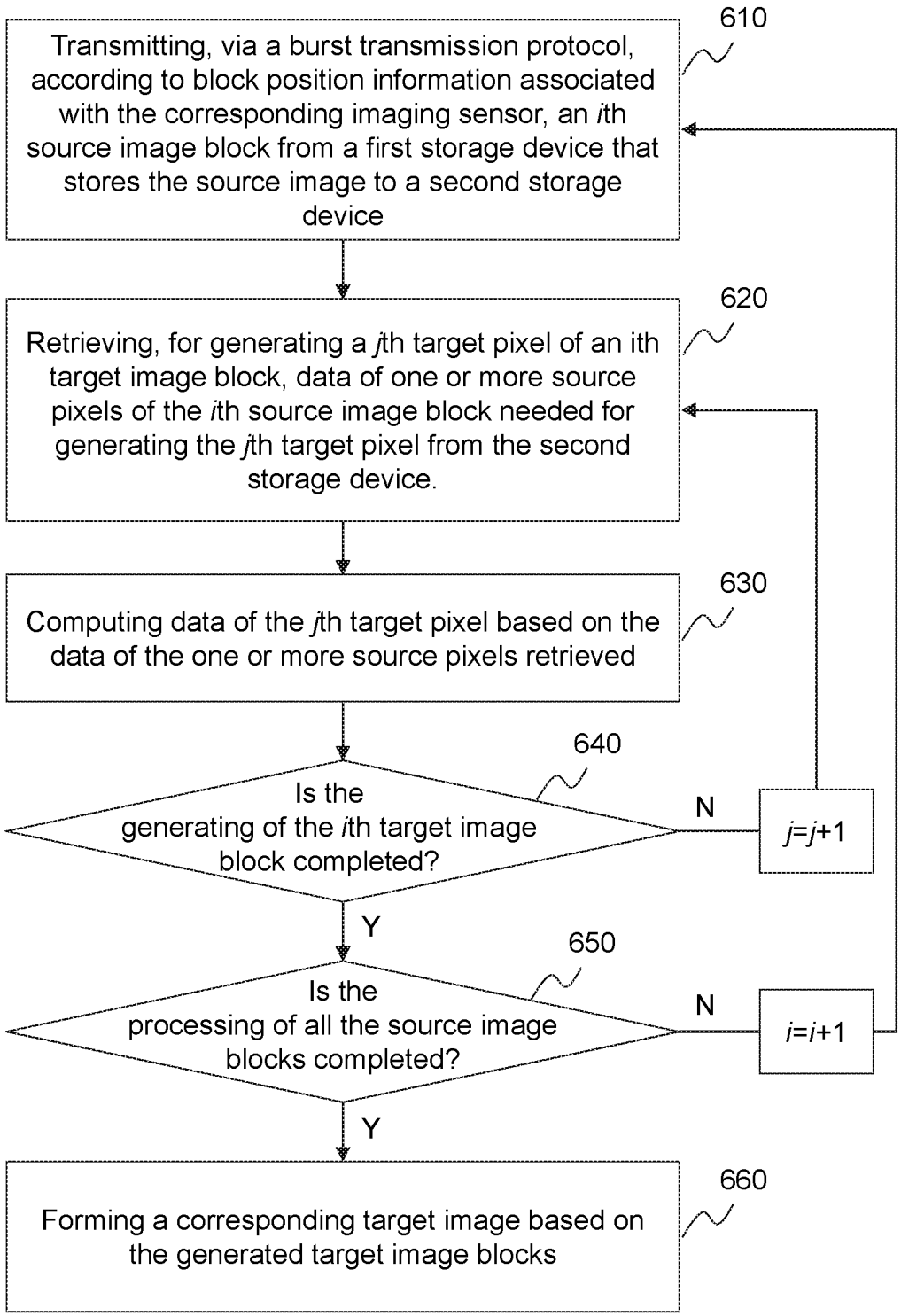
FIG. 6 is a flowchart illustrating an exemplary process for processing a source image to generate a target image according to some embodiments of the present disclosure.

FIG. 6 is a flowchart illustrating an exemplary process 600 for processing a source image to generate a target image according to some embodiments of the present disclosure. The process 600 may be an example of a combined process of the processes 400 and 500, and may be implemented by the image processing device 300. By repeating the process 600, the operation 420 illustrated in FIG. 4 may be achieved. In some embodiments, the process 600 illustrated in FIG. 6 may be implemented in the imaging system 100 illustrated in FIG. 1 (e.g., by the image processing device 120). For example, the process 600 illustrated in FIG. 6 may be stored in a storage device (e.g., the storage device 122, the storage device 220, the ROM 230, the RAM 240) in the form of instructions, and invoked and/or executed by one or more processors (e.g., the processor 210) of the image processing device 120.

In 610, the processing module 310 may transmit (block-by-block), via a burst transmission protocol, according to the block position information associated with the corresponding imaging sensor, an ith source image block from a first storage device that stores the source image to a second storage device. i may be an integer between 1 and the total number B of the source image blocks. i may be 1 at the first time the operation 610 is performed. Data of the ith source image block for generating an ith target image block may be retrieved from the second storage device.

In 620, the processing module 320 may retrieve, for generating a jth target pixel of the ith target image block, data of one or more source pixels of the ith source image block needed for generating the jth target pixel from the second storage device. j may be an integer between 1 and the total number $P_i$ of the target pixels of the ith target image block. j may be 1 at the first time the operation 620 is performed.

In 630, the processing module 320 may compute data of the jth target pixel based on the data of the one or more source pixels retrieved via a transformation function. For example, a pixel value of the jth target pixel corresponding to a color channel may be a weighted sum or weighted mean of the pixel values of the one or more source pixels retrieved corresponding to the same color channel. The weights associated with the one or more source pixels may be coefficients of the transformation function and may be obtained according to the algorithm for generating the combined image (e.g., a stitching algorithm for generating a panorama). In some embodiments, the transformation function and the weights may be in the form of a filter, and the one or more source pixels may be included in a region of the source image block where the filter is applied for computing data of the corresponding target pixel.

In 640, the processing module 320 may detect whether the generating of the ith target image block is completed, e.g., by detecting whether j is equal to or more than $P_i$. In response to a detection that the generating of the ith target image block is completed, the processing module 320 may trigger the operation 650. Otherwise, the processing module 320 may plus j by one and trigger the operation 620 again.

In 650, the processing module 320 may detect whether the processing of all the source image blocks is completed, e.g., by detecting whether i is equal to or more than B. In response to a detection that the processing of all the source image blocks is completed, the processing module 320 may trigger the operation 660. Otherwise, the processing module 320 may plus i by one and trigger the operation 610 again.

In 660, the processing module 320 may form a corresponding target image based on the generated target image blocks. The operation 660 may be same as or similar to the operation 530, which is not repeated herein.

In some embodiments, the operations 620 to 650 may be performed by a plurality of processing cores (or processors) concurrently to improve the efficiency for processing the plurality of source image blocks.

In some embodiments, there may be multiple (e.g., 2) second storage devices for receiving the source image blocks transmitted from the first storage device. The processing module 320 may transmit the plurality of source image blocks from the first storage device to the multiple second storage devices (e.g., via a burst transmission protocol) in turn. The processing of a first source image block in one of the multiple second storage devices (e.g., the operations 620 to 640) and the transmission of a second source image block from the first storage device to another one of the multiple second storage devices may be performed concurrently. For example, after a source image block #1 is transmitted into a second storage device #1, the processing module 320 may start to process the source image block #1 to generate the corresponding target image block. During the processing of the source image block #1, the transmitting of a source image block #2 to the source image block #2 may be performed concurrently. After the processing of the source image block #1 is completed, the processing module 320 may process the source image block #2 immediately without waiting for the transmission of the source image block #2, and a source image block #3 may be transmitted into the source image block #1, concurrently. According to such a processing and data transmission manner, the efficiency for processing the source image blocks may be further improved.

As another example, the multiple second storage devices may each be in communication with a processing core (or processor) of the processing device 300. The processing cores may operate concurrently to generate target image blocks based on the source image blocks transmitted to the corresponding second storage devices.

It is noted that the above descriptions of the process 600 are only for demonstration purposes, and not intended to be limiting. It is understandable that, after learning the major concept of the present disclosure, a person of ordinary skills in the art may alter the process 600 in an uncreative manner. For example, the operations above may be implemented in an order different from that illustrated in FIG. 6. One or more optional operations may be added to the flowcharts. One or more operations may be split or be combined. All such modifications are within the scope of the present disclosure.

FIG. 7 is a flowchart illustrating an exemplary process 700 for obtaining block position information associated with the plurality of imaging sensors according to some embodiments of the present disclosure. The process 700 may be implemented by the image processing device 300. In some embodiments, the process 700 illustrated in FIG. 7 may be implemented in the imaging system 100 illustrated in FIG. 1 (e.g., by the image processing device 120). For example, the process 700 illustrated in FIG. 7 may be stored in a storage device (e.g., the storage 122, the storage device 220, the ROM 230, the RAM 240) in the form of instructions, and invoked and/or executed by one or more processors (e.g., the processor 210) of the image processing device 120.

The process 700 may be described on the premise that the combined image to be generated is a panorama. However, it is understood that a similar process may be adopted for generating other kinds of combined image.

In 710, the calibration module 340 may retrieve a plurality of calibration source images generated by the plurality of imaging sensors. As used herein, a calibration source image may refer to a certain source image that is used to determine or update the position information associated with an image sensor capturing the certain source image.

The plurality of calibration source images and the plurality of source images described in the aforementioned processes for generating the panorama (the combined image) may be generated with the same set of imaging parameters. If one or more of the imaging parameters are changed, the process 700 may be re-performed for re-obtaining or updating the block position information associated with at least one of the plurality of imaging sensors.

In 720, the calibration module 340 may generate, based on the plurality of calibration source images, a plurality of calibration target images via a panorama generating algorithm, such as the aforementioned stitching algorithm or a variant thereof. The operation 720 may also be referred to as a preprocessing in the present disclosure.

For example, each adjacent pair of the plurality of calibration source images may include overlapping regions. The calibration module 340 may transform the coordinate systems of the plurality of calibration source images collected by the plurality of imaging sensors to project the calibration source images onto a same two-dimensional plane to form a plurality of two-dimensional images. The calibration module 340 may then perform a distortion correction on the plurality of two-dimensional images to obtain a plurality of corrected images. Next, the calibration module 340 may perform an image registration on the overlapping region of any adjacent pair of the plurality of corrected images. The calibration module 340 may extract one or more features such as a speeded up robust features (SURF) feature, a scale-invariant feature transform (SIFT) feature, or the like, or a combination thereof and perform the image registration based on the extracted one or more features. The calibration module 340 may then fuse the plurality of corrected images according to the registration result to obtain a fused image, during which one or more of the plurality of corrected images may be rotated, scaled, or adjusted on color/brightness/contrast, etc. The obtained fused image may be shapeless, and the calibration module 340 may crop the fused image to generate a panorama. The calibration module 340 may then divide the panorama into the plurality of calibration target images by identifying the correspondence between image portions of the panorama and the plurality of calibration source images. The obtained plurality of calibration target images may be partially overlapped or not. The obtained plurality of calibration target images may have the same shape/size or not.

The aforementioned transformation function and/or the weights for generating target image blocks based on the corresponding source image blocks (e.g., as described in FIG. 5) may be in accordance with the panorama generating algorithm. In some embodiments, the same transformation function and/or the weights may be determined via the above algorithm and used for processing the plurality of calibration source images to generate the fused image.

In 730, the calibration module 340 may obtain, based on the plurality of calibration source images and the plurality of calibration target images, block position information associated with the plurality of imaging sensors. In some embodiments, to achieve the operation 730, for each of the plurality of imaging sensors, the calibration module 340 may perform a process as illustrated in FIG. 8.

FIG. 8 is a flowchart illustrating an exemplary process 800 for obtaining, based a calibration source image and a calibration target image, block position information associated with the corresponding imaging sensor according to some embodiments of the present disclosure. The process 800 may be implemented by the image processing device 300 to obtain block position information associated with a kth imaging sensor of the plurality of imaging sensors, wherein k may be an integer between 1 and the number of the plurality of imaging sensors. In some embodiments, the process 800 illustrated in FIG. 8 may be implemented in the imaging system 100 illustrated in FIG. 1 (e.g., by the image processing device 120). For example, the process 800 illustrated in FIG. 8 may be stored in a storage device (e.g., the storage 122, the storage device 220, the ROM 230, the RAM 240) in the form of instructions, and invoked and/or executed by one or more processors (e.g., the processor 210) of the image processing device 120.

Figure 12:
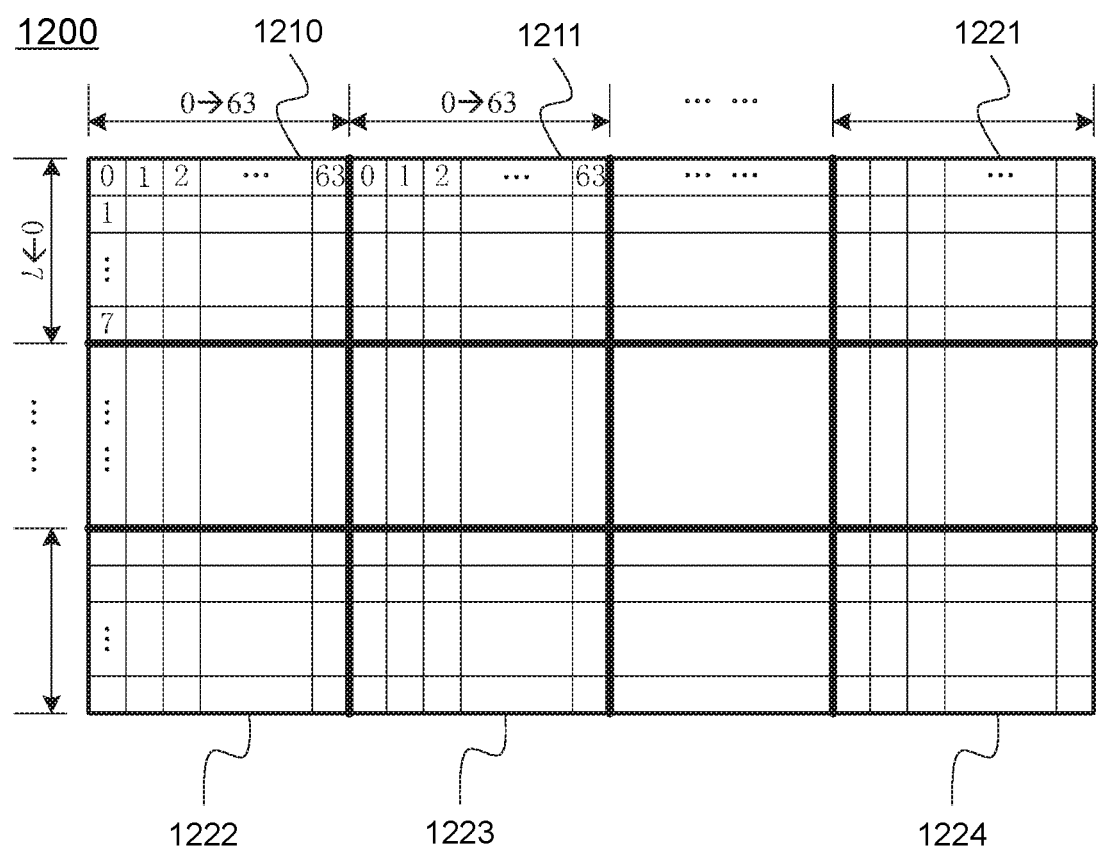
FIG. 12 is a schematic diagram illustrating an exemplary division pattern of a calibration target image according to some embodiments of the present disclosure.

In 810, the calibration module 340 may divide the calibration target image (e.g., the kth calibration target image) into a plurality of calibration target image blocks. The dividing may be performed according to a predetermined division pattern (e.g., as illustrated in FIG. 12). The plurality of calibration target image blocks may be non-overlapping and preferably have the same shape/size. However, according to the shape/size of the calibration target image, the calibration target image blocks at one or more edges of the calibration target image may have different shapes/sizes compared to other calibration target image blocks.

In 820, for each of the plurality of calibration target image blocks, the calibration module 340 may identify, according to the algorithm adopted in the operation 720 (or the transformation function and/or weights determined based on the algorithm), an image region in the corresponding calibration source image (e.g., the kth calibration source image) including pixels for generating the calibration target image block as a corresponding calibration source image block. For example, for each pixel of an mth calibration target image block of the plurality of calibration target image blocks, the calibration module 340 may identify, one or more pixels in the calibration source image used for generating the pixel, wherein m is an integer between 1 and the number of the plurality of calibration target image blocks.

In some embodiments, the identification may be viewed as a reverse version of the algorithm adopted in the operation 720. For example, if a projection and a distortion correction is involved in the algorithm adopted in the operation 720, a reverse version of the projection (e.g., back projection) and a reverse version of the distortion correction (which may be viewed as another distortion correction) may be involved in the identification.

The calibration module 340 may then determine an image region (e.g., denoted in the form of a coordinate range) in the calibration source image including all the identified pixels as the corresponding calibration source image block (e.g., the mth calibration source image block). In some embodiments, the calibration source image block may be the smallest rectangular image region including all the identified pixels (e.g., as illustrated in FIG. 13). Such a rectangular image region may also include pixels (if any) not used for generating the corresponding calibration target image block. It is understood that, the calibration source image blocks may also have other proper shapes.

In 830, the calibration module 340 may obtain the block position information associated with the kth imaging sensor indicating positions of the calibration source image blocks in the corresponding calibration source image. The positions may be denoted in the form of coordinate ranges or a coordinate point set (a coordinate point is formed by a pair of coordinates of a corresponding pixel). For example, the block position information associated with one rectangular calibration source image block may include the starting coordinates (e.g., the coordinates of the pixel at the top left corner), the length, and the width of the rectangular calibration source image block. As another example, the block position information associated with one rectangular source image block may include the starting coordinates and the ending coordinates (e.g., the coordinates of the pixel at the bottom right corner) of the calibration source image block. As a further example, the block position information associated with one source image block (rectangular or not) may include the coordinates of all the pixels of the source image block.

In some embodiments, the division pattern of the kth calibration target image and the mapping relationship between the calibration source image blocks and the calibration source image blocks may also be included in the block position information for guiding the splicing of the target image blocks in the operation 530. The division pattern of the kth calibration target image may serve as the aforementioned splicing pattern.

As there is a correspondence between the pixels of the imaging sensor and the pixels of the calibration source image block, a calibration source/target image block and a corresponding source/target image blocks may cover the same coordinate range. Once the block position information is obtained, it may be used for retrieving source image blocks in any subsequent image (or frame) generated by the same imaging sensor for generating a panorama, until one or more of the imaging parameters of the imaging sensor are changed.

The process 800 may be performed regardless the image content of the kth calibration source image and the kth calibration target image. So in the process 800, the calibration target image, the calibration target image blocks, and the calibration source image blocks may also be replaced by the form of coordinate ranges or coordinate point sets that represent the calibration target image, the calibration target image blocks, and the calibration source image blocks.

As the starting coordinates of a source image block is important for locating the source image block in the corresponding source image and may generally be included in the block position information, the process 800 may also be referred to as an initialization of the starting coordinates of the source image blocks.

It is noted that the above descriptions of the processes 700 and 800 are only for demonstration purposes, and not intended to be limiting. It is understandable that, after learning the major concept of the present disclosure, a person of ordinary skills in the art may alter the process 700 or 800 in an uncreative manner. For example, the operations above may be implemented in an order different from that illustrated in FIG. 7 or 8. One or more optional operations may be added to the flowcharts. One or more operations may be split or be combined. All such modifications are within the scope of the present disclosure.

FIG. 9 is a schematic diagram illustrating an exemplary process 900 for generating a panoramic video stream according to some embodiments of the present disclosure. The process 900 may be an embodiment of a combination of the aforementioned processes. For demonstration purposes and not intended to be limiting, the process 900 may be described on the premise that the imaging system 100 is a triple-lens camera including three imaging sensors (imaging sensors #1, #2, and #3), at least three processing cores (or processors), and a DDR storage device 910 (first storage device, e.g., a DDR SDRAM, a DDR SDRAM array). It is understood that, the numbers of the above components may be adjusted according to actual needs.

For a video stream obtained from each imaging sensor, the DDR storage device 910 may include a buffering queue (e.g., the queues 921, 922 and 923) for buffering three (or more) frames such as the Frames n, n+1, and n+2, wherein n is an integer above 1. The buffering queue may store the frames (or source images) in a cycling manner. For example, the buffering queue may include a plurality of cells, each cell may be implemented by a plurality of continuous storage units for buffering or storing a frame. The frame right to be processed may be at the head (e.g., the cell labeled as Frame n) of the buffering queue. The latest obtained frame may be added to the other end of the buffering queue as the tail (e.g., the cell labeled as Frame n+2). When the processing of the frame at the head of the queue is completed, the cell (e.g., the cell labeled as Frame n+1) next to the head (e.g., the cell labeled as Frame n) may be made as the new head, and a new frame may be stored into the queue as the new tail.

The processes 930, 940, and 950 for processing the three video streams may be substantially the same. The frames (or source images) of the video streams may be stored into buffering queues 921, 922, and 923 of the DDR storage device 910 (operations 931, 941, and 951).

When calibration source images (e.g., the first frames of the three video streams (n=1)) are stored into the DDR storage device 910, concurrently, a preprocessing (e.g., the operation 720) may be performed based on the calibration source images to obtain three corresponding target images (calibration target images). For example, the preprocessing may involve image projection, distortion correction, etc. According to the starting coordinates, length, and width of the calibration target images obtained via the preprocessing, coordinates of the calibration target image blocks may be generated (operations 932, 942, and 952). Then via back projections (operations 933, 943, and 953), distortion corrections (operations 934, 944, and 954), etc., the coordinates of the source images corresponding to the target image blocks may be computed. By processing the computed coordinates of the source images, starting coordinates of the source image blocks may be initialized and thus the block position information associated with the imaging sensors #1, #2, and #3 may be obtained accordingly (operations 935, 945, and 955). The above operations may only have to be performed when the triple-lens camera is turned on, or one or more imaging parameters of the imaging sensor #1, #2, or #3 have been changed. For each of the subsequent frames (e.g., starting from the second frames (n=2)), the source image blocks may be retrieved from the DDR storage device 910 according to the corresponding block position information (e.g., according to operations 936, 946, and 947) to generate the corresponding target image blocks (operations 937, 947, and 957). The target image blocks may then be spliced (e.g., by sequentially storing the target image blocks into a continuous storage region) to form the target images (e.g., target images #1, #2, and #3).

After the three target images are obtained respectively, the triple-lens camera may sequentially store the three target images into the DDR storage device 910 and combine the three target images into a panorama (operations 938, 948, and 958). For example, the generated panorama may be added into a buffering queue 924. The triple-lens camera may retrieve panoramas form the DDR storage device 910 (operation 960) to form a panoramic video stream.

Detailed descriptions of the process 900 may be found elsewhere in the present disclosure (e.g., in connection with FIGS. 4 to 8), and is not repeated herein.

Figure 10:
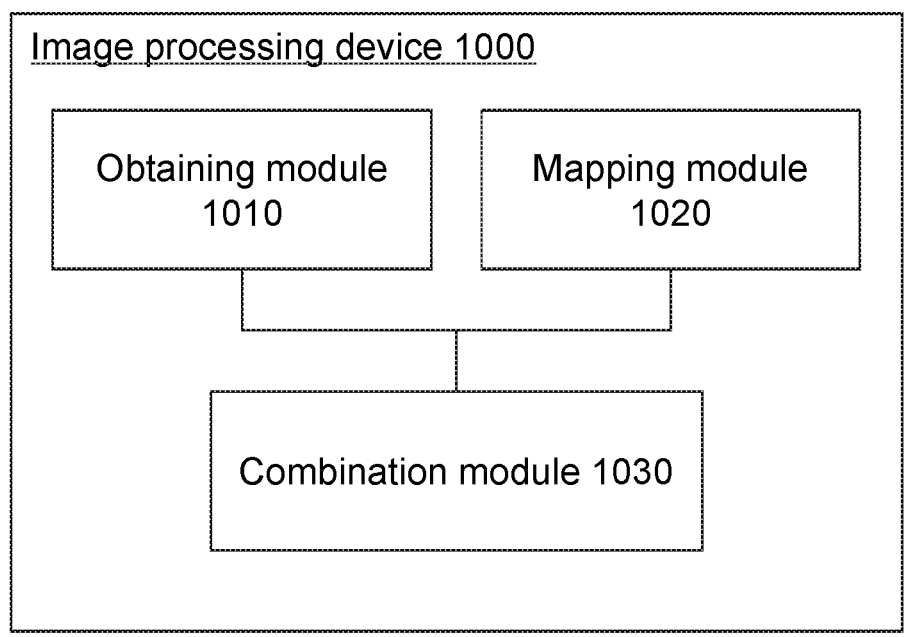
FIG. 10 is a schematic diagram illustrating an exemplary panorama device according to some embodiments of the present disclosure.

FIG. 10 is a schematic diagram illustrating an exemplary panorama device 1000 according to some embodiments of the present disclosure. The image processing device 1000 may be an embodiment of the image processing device 120 as illustrated in FIG. 1, and may process a plurality of video streams for generating a panoramic video stream. The panorama device 1000 may include an obtaining module 1010, a mapping module 1020, and a combination module 1030. In some embodiments, the image processing device 1000 may be implemented by at least one processor (e.g., the processor 210) to perform an image processing process as illustrated in FIG. 11.

The panorama device 1000 may be another form of the imaging processing device 300.

The obtaining module 1010 may be configured to obtain a plurality of source video streams and obtain predetermined block position information. Each item of the block position information may indicate the position of a source image block in the plurality of source video streams.

The mapping module 1020 may be configured to retrieve, based on each item of the position information, a source image block from the plurality of source video streams.

The combination module 1030 may be configured to generate a plurality of target images based on the obtained source image blocks, and combine the plurality of target images into a panorama.

In some embodiments, the panorama device 1000 may further include a calibration module (corresponding to the calibration module 340), which may be configured to set the block position information before obtaining the plurality of source video streams by: obtaining a set of calibration source images; analyzing and processing each of the set of calibration source images to transform the calibration source image into a corresponding calibration target image; obtaining processing parameters of the calibration target image corresponding to each calibration source image, wherein the processing parameters of one calibration target image may at least indicate the starting coordinates of the calibration target image in the corresponding calibration source image, the length, and the width of the calibration target image; and forming the block position information with the determined information.

In some embodiments, the calibration module may be configured to: divide a calibration target image according to parameters indicating the length and the width of the calibration target image included in the processing parameters of the calibration target images, so as to obtain a plurality of calibration target image blocks; and for each of the calibration target image blocks included in a target image: determine a first coordinate point set of the calibration target image block according to the parameter indicating its starting coordinates in the processing parameters, the first coordinate point set including the coordinates of all the pixels of the calibration target image block; determine, according to parameters for geometric transformation included in the processing parameters, a second coordinate point set of the calibration source image, the second coordinate point set corresponding to the first coordinate point set of the calibration target image block; and determine according to the second coordinate point set corresponding to the target image block, the information on positions of image portions of the corresponding calibration source image corresponding to calibration target image blocks of the calibration target image.

In some embodiments, the calibration module may be configured to: analyze the abscissas and ordinates of the second coordinate point set corresponding to the calibration target image block to determine the minimum abscissa, the minimum ordinate, and the maximum ordinate; determine, based on the minimum abscissa and the minimum ordinate, the starting coordinates of the calibration source image block corresponding to the calibration target image block; determine, based on the minimum ordinate and the maximum ordinate, the rowspan of the calibration source image block corresponding to the calibration target image block; and determine, based on the starting coordinates and the rowspan, information on the position of the calibration source image block corresponding to the calibration target image block.

In some embodiments, to retrieve each source image block from a source image video stream, the mapping module 1020 may be configured to: determine a third coordinate point set for a source image block to be retrieved, wherein the third coordinate point set may include coordinates of all the pixels in the source image block; and retrieve a corresponding source image block from the source image video stream based on the third coordinate point set and the block position information associated with the source image block.

In some embodiments, to generate a target image block based on a source image block, the combination module 1030 may be configured to: retrieve pixel values of a plurality of source pixels in the source image block corresponding to the second coordinate point set of the target image block to be generated, and pixel values of the neighboring source pixels of each of the plurality of source pixels; for each color channel of the target image to be generated, determine the pixel value for each coordinate point of the second coordinate point set by computing a weighted mean of the pixel value of a corresponding source pixel in the retrieved plurality of source pixels and the pixel values of the neighboring pixels of the source pixel; and generate a target image block based on the pixel values of all the coordinate points of the second coordinate point set.

In some embodiments, the combination module 1030 may be configured to: combine the plurality of target images into a panorama according to a predetermined rule, where in the predetermined rule may indicate the combination order of the plurality of target images FIG. 11 is a flowchart illustrating an exemplary process 1100 for generating a panorama according to some embodiments of the present disclosure. The process 1100 may be implemented by one or more panorama devices 1000, which may be in the form of, for example, cameras, a multi-lens camera, etc. The process 1100 may be an embodiment of the process 400 illustrated in FIG. 4 for generating a panorama. In some embodiments, the process 1100 illustrated in FIG. 8 may be implemented in the imaging system 100 illustrated in FIG. 1 (e.g., by the image processing device 120). For example, the process 800 illustrated in FIG. 8 may be stored in a storage device (e.g., the storage 122, the storage device 220, the ROM 230, the RAM 240) in the form of instructions, and invoked and/or executed by one or more processors (e.g., the processor 210) implementing the video processing device 120.

In 1110, a plurality of source video streams (source images) may be obtained, and block position information may be determined. Each item of the block position information may indicate the position of a source image block in the plurality of source video streams.

The operation 1110 may be performed by the obtaining module 1010.

In 1120, based on each item of the block position information, a source image block may be retrieved from the plurality of source video streams.

The operation 1120 may be performed by the mapping module 1020.

In 1130: a plurality of target images may be generated based on the obtained source image blocks, and the plurality of target images may be combined into a panorama.

The operation 1130 may be performed by the combination module 1030.

In the operation 1110, panorama devices 1000 (e.g., cameras) at different locations may capture a plurality of source images in real-time, which may serve as the plurality of video streams. Alternatively or additionally, panorama devices 1000 (e.g., cameras) with different shooting angles may capture a plurality of source images of different shooting angles in real-time, which may also serve as the plurality of video streams. In some embodiments, the captured source images may be spherical images (e.g., the panorama devices 1000 are fisheye cameras).

The plurality of source video streams captured by the panorama devices 1000 may be buffered in a DDR storage device (e.g., the DDR storage device 910). In some embodiments, the panorama devices 1000 may be integrated into a multi-lens camera. For each video stream, the DDR storage device may include a buffer queue (e.g., the buffer queues 921 to 923) for buffering three (or more) frames. The captured source video streams may be stored in the DDR storage device in a cycling manner.

When capturing the plurality of source video streams, the panorama devices 1000 may determine preset block position information. The block position information may include a plurality of items. Each item of the block position information may indicate the position of a source image block in the plurality of source video stream. In some embodiments, the position may be denoted in the form of a coordinate range.

In some embodiments, before obtaining the plurality of source video streams, the block position information may be set via the following operations A1 to A5. The operations A1 to A5 may be performed by the calibration module of the panorama device 1000.

A1: obtaining a set of calibration source images.

A2: analyzing and processing each of the set of calibration source images to transform the calibration source image into a corresponding calibration target image. (e.g., as described in the operation 720). A panorama generating algorithm (e.g., a stitching algorithm) may be used for performing the operation A2.

A3: obtaining processing parameters of the calibration target image corresponding to each calibration source image. The processing parameters of one calibration target image may at least indicate the starting coordinates of the calibration target image in the corresponding calibration source image, the length, and the width of the calibration target image. The processing parameters may be obtained according to the panorama generating algorithm adopted in the operation A2.

A4: determining, based on the processing parameters of each calibration target image, information on positions of image portions (calibration source image blocks) of the corresponding calibration source image corresponding to a plurality of calibration target image blocks of the calibration target image.

A5: forming the block position information with the information determined in the operation A4.

In some embodiments of the present disclosure, after the panorama devices 1000 are installed or one or more of the panorama devices 1000 are moved, before generating a panorama, the panorama devices 1000 may capture a set of calibration source images. At least some of the set of the calibration source images may be captured by panorama devices 1000 at different locations, such as cameras at different locations. Alternatively or additionally, at least some of the set of calibration source images may be captured by lens of a multi-lens camera having different capturing angles.

Then, the panorama devices 1000 may analyze and process (preprocessing) each of the set of calibration source images to transform the calibration source image into a corresponding calibration target image, and acquire processing parameters of the calibration target images. The processing parameters of a calibration target image may indicate at least the starting coordinates of the calibration target image in the corresponding calibration source image, and the length and the width of the calibration target image.

In some embodiments, the processing parameters obtained via the preprocessing may include parameters for geometric transformation, parameters for distortion correction, parameters indicating the length and the width of the calibration target image, and parameters indicating the starting coordinates of the calibration target image, or the like, or a combination thereof. In some embodiments, the parameters for geometric transformation may be used to project a spherical source image (or spherical calibration source image) onto a two-dimensional plane to generate a corresponding two-dimensional image.

Based on the processing parameters of each calibration target image, the panorama devices 1000 may independently determine information on positions of image portions (calibration source image blocks) of the corresponding calibration source image corresponding to the plurality of calibration target image blocks of the calibration target image. The determination may be performed in parallel.

In some embodiments, to achieve the operation A4, the following operations B1 and B2 may be performed by the calibration module of the panorama device 1000.

In B1, the splicing pattern of the calibration target image may be determined by the corresponding panorama device. For example, the panorama device 1000 may divide the calibration target image according to parameters indicating the length and the width of the calibration target image included in the processing parameters of the calibration target images, so as to obtain a plurality of calibration target image blocks. The length and width of a calibration target image block may be determined based on the coordinate range of pixels in the calibration source image to be obtained by performing a back projection upon pixels of the calibration target image block via a back projection algorithm, the data transmission efficiency of the DDR storage device, and the computation resources of the hardware of the panorama device. The length and width of the calibration target image block at the edges of the calibration target image may be set according to actual situation. For example, the length/width of the calibration target image may not be an integral multiple of the predetermined length/width of the calibration target image block, then the length and width of the calibration target image block at the edges of the target image may be divided according to actual situation.

Referring to FIG. 12. FIG. 12 is a schematic diagram illustrating an exemplary division pattern of a calibration target image according to some embodiments of the present disclosure. The calibration target image 1200 may be divided into a plurality of calibration target image blocks (e.g., the calibration target image blocks 1210 and 1211). For example, the size of each calibration target image block may be determined as 64×8. The sizes of the calibration target image blocks at the edges of the calibration target image (the calibration target image blocks 1221 to 1224) may be determined according to actual situation. For example, the width of a calibration target image block at the bottom edge of the calibration target image may be the remainder from dividing the width of the calibration target image block by the determined width of the calibration target image block, while the length of a calibration target image block at the right edge of the calibration target image may be the remainder from dividing the length of the calibration target image block by the determined length of the calibration target image block.

In B2, following operations C1 to C3 may be performed respectively on each of the calibration target image blocks included in a target image:

In C1, the starting position of the calibration target image block may be determined according to the parameter(s) indicating its starting coordinates in the processing parameters. Then coordinates of each pixel (e.g., in the form of a coordinate point) of the target image block may be computed from left to right and from top to bottom. The computed coordinates may form a first coordinate point set of the calibration target image block (e.g., the coordinate range of the calibration target image block).

In traditional approaches, data is directly retrieved from a storage device (e.g., a DDR storage device) in a pixel-to-pixel manner, the efficiency of data transmission is very low. In the present disclosure, according to the continuity of an image, pixels in a source image for generating pixels of an image block (e.g., a target image block) of the target image must be within a certain range (e.g., a source image block). Thus, the pixel-to-pixel data retrieving of individual pixels may be replaced by a block-to-block data retrieving of a corresponding source image block. A burst data transmission protocol of the DDR storage device may be adopted to retrieve a source image block mapping to a target image block to be generated from the DDR storage device, which may greatly improve the efficiency of the data transmission of the DDR storage device, and enable the panorama generation to be performed in real-time.

Referring to FIG. 13. FIG. 13 is a schematic diagram illustrating an exemplary determination of a calibration source image block mapping to a calibration target image block according to some embodiments of the present disclosure.

In C2, according to parameters for geometric transformation included in the processing parameters, the panorama device 1000 may adopt a back projection algorithm to compute the coordinates (e.g., in the form of coordinate points) of pixels in the calibration source image corresponding to the coordinates of pixels of the calibration target image block, that is, to determine a second coordinate point set of the calibration source image. The second coordinate point set may correspond to the first coordinate point set of the calibration target image block. The operation C2 may also be referred to as mapping in the present disclosure.

In C3, according to the second coordinate point set corresponding to the target image block, the panorama device 1000 may determine the information on positions of image portions (calibration source image blocks) of the corresponding calibration source image corresponding to calibration target image blocks of the calibration target image.

In some embodiments, the panorama device 1000 may perform, according to parameters for distortion correction in the processing parameters, a distortion correction on the coordinates of the computed pixels of the calibration source image via a distortion correction algorithm.

In some embodiments, the operation C3 may be achieved via, for example, the following operations D1 to D4, which are only for demonstration purposes and not intended to be limiting.

In D1, the abscissas and ordinates of the second coordinate point set corresponding to the calibration target image block may be analyzed to determine the minimum abscissa, the minimum ordinate, and the maximum ordinate.

In D2, based on the minimum abscissa and the minimum ordinate, the starting coordinates of the calibration source image block corresponding to the calibration target image block may be determined; and based on the minimum ordinate and the maximum ordinate, the rowspan (or width) of the calibration source image block corresponding to the calibration target image block may be determined.

For example, as shown in FIG. 13, according to the continuity of an image, pixels obtained by mapping pixels of a calibration target image block (e.g., the calibration target image block 1311) to the calibration source image (e.g., the source image 1320) must be within a certain range. By analyzing all the pixels obtained by mapping the pixels of the calibration target image block to the calibration source image, the minimum abscissa (x-axis) and the minimum ordinate (y-axis) may be obtained respectively, which may form the starting coordinates of the calibration source image block (e.g., the calibration source image block 1321) to be determined. The maximum ordinate may be obtained as well. By computing the difference between the maximum ordinate and the minimum ordinate, the rowspan (or width) of the calibration source image block may be obtained.

In D3, the panorama device 1000 may determine, based on the starting coordinates and the rowspan, information on the position of the calibration source image block corresponding to the calibration target image block.

In D4, the panorama device 1000 may store the starting coordinates and the rowspans of the calibration source image blocks corresponding to all the calibration target images into a fourth storage device such as an RAM, so as to achieve the initialization of the starting coordinates of the source image block or the obtaining of the block position information. The fourth storage device may be the aforementioned second storage device, the third storage device, or a different storage device.

The initialization of the starting coordinates of the source image block may be completed only in a time interval corresponding to one frame after the panorama device 1000 is powered on or one or more of the processing/imaging parameters of the panorama device 1000 are changed. With the determined block position information, to process a subsequent frame, the storage position (e.g., denoted in the form of a plurality of addresses or an address range) of the source image block corresponding to a target image block of the subsequent frame in the DDR storage device may be determined quickly. Also, the initialization may be performed in real time, so that the panorama device, such as a multi-lens camera, may adapt to different scenes, and the requirements of the relative positions and shooting angles of the lens of the multi-lens camera may be reduced. Simply by collecting a set of calibration source images and calculating the block position information, the flexibility of the multi-lens camera in different application scenarios may be greatly improved.

Then, the process 1000 may proceed to the operation 1020, that is, retrieving, based on each item of the block position information, a source image block from the plurality of source video streams.

When the panorama device 1000 retrieve each source image block from the source image video stream, the following operations E1 and E2 may be performed:

E1: Determining a third coordinate point set for the source image block to be retrieved. The third coordinate point set may include coordinates (e.g., in the form of coordinate points) of all the pixels in the source image block.

E2: Retrieving a corresponding source image block from the source image video stream based on the third coordinate point set and the block position information associated with the source image block.

That is to say, the panorama device 1000 may determine the coordinates of all the pixels in the source image block, and then the corresponding source image block may be retrieved from the source video stream according to the coordinates and the block position information of the source image block.

In some embodiments, when the panorama device 1000 is to process the second frame, the panorama device 1000 may: retrieve, from the fourth storage device (e.g., RAM), the starting coordinates and the rowspan of a first source image block; compute and determine the position and the size of the first source image block in the DDR according to the starting coordinates and the rowspan; and then retrieve the first source image block from the source image video streams. The data of the first source image block may be stored in a second storage device A (e.g., an RAM) of the panorama device 1000. In some embodiments, the plurality of imaging sensors 110 may be remote, and the second storage device A may be local.

After the first source image block is retrieved from the DDR storage device, the starting coordinates and the rowspan of the next source image block may be retrieved, and the data of the next source image block may be retrieved and stored in another second storage device B (e.g., RAM).

In 1130, the panorama device 1000 may generate a plurality of target images based on the obtained source image blocks, and combine the plurality of target images into a panorama.

In some embodiments, the operation 1130 may include generating each of the plurality of target image blocks via operations F1 to F3 as following.

F1: Retrieving pixel values of a plurality of source pixels in the source image block corresponding to the second coordinate point set of the target image block to be generated, and pixel values of the neighboring source pixels of each of the plurality of source pixels.

For example, if the panorama device 1000 needs to retrieve the pixel value(s) of a source pixel in the source image block corresponding to a coordinate point of the second coordinate point set of the target image block to be generated, the panorama device 1000 may search, according to the coordinate point, the corresponding source pixel and one or more neighboring pixels of the source pixels in the source image block. The one or more neighboring pixels may be the pixel(s) adjacent to the source pixel.

F2: For each color channel of the target image to be generated, determining the pixel value for each coordinate point of the second coordinate point set by computing a weighted mean of the pixel value of a corresponding source pixel in the retrieved plurality of source pixels and pixel value(s) of the neighboring pixel(s) of the source pixel. For example, if the pixel value of the source pixel and the pixel value of one neighboring pixel of the source pixel are retrieved, the pixel value of the corresponding target pixel may be determined as the weighted mean of the pixel values of the two pixels. If the pixel value of the source pixel and pixel values of a plurality of neighboring pixels are retrieved, the pixel value of the corresponding target pixel may be determined as the weighted mean of the pixel values of the source pixel and pixel values of the plurality of neighboring pixels.

In some embodiments, the operation F2 may be achieved by applying a filter (formed by the weights) on the source image block. The source pixel and the neighboring pixels may be the region where the filter is applied.

F3: generating a target image block based on the pixel values of all the coordinate points of the second coordinate point set. That is, after the pixel value of each coordinate point in the second coordinate point set of the target image block to be generated is determined, the target image block may be generated with pixel values.

Referring to FIG. 14. FIG. 14 is a schematic diagram illustrating an exemplary retrieving of data of a source pixel (e.g., the source pixel 1422) mapping to a target pixel (e.g., the target pixel 1412) to be generated according to some embodiments of the present disclosure.

After a source image block (e.g., the source image block 1421) is retrieved from the DDR storage device and stored in a second storage device (e.g., an RAM), the panorama device 1000 may generate the coordinates of the source pixels of the source image block. Based on the generated coordinates and the starting coordinates, the storage positions (e.g., denoted in the form of addresses) of the source pixels in the second storage device may be obtained.

For example, the starting coordinates of the source image block may be associated with a starting address of the DDR storage device. The starting address may indicate the storage unit(s) of the second storage device that stores the data of the source pixel having the starting coordinates. Such an association may be included in the block position information. To determine an address of a source pixel in the second storage device, the panorama device 1000 may compute relative coordinates ($\Delta x, \Delta y$) of the source pixel with respect to the starting coordinates. According to the continuity of an image, the panorama device 1000 may determine the address of the source pixel based on the starting address associated with the starting coordinates and the relative coordinates ($\Delta x, \Delta y$) of the source image.

For each color channel, the panorama device 1000 may retrieve the corresponding pixel values of the source pixel (e.g., the source pixel 1422) and the neighboring pixel(s) thereof from the second storage device (e.g., an RAM). The panorama device 1000 may obtain the pixel value of the corresponding target pixel (e.g., the target pixel 1412) of the target image block (e.g., the target pixel 1411) by computing the weighted mean of the retrieved pixel values. A pixel-to-pixel data retrieving approach may be adopted for quickly retrieving, from the second storage device, the pixel values of the source pixels mapping to the target pixels of the target image block, so as to generate a corresponding target image (e.g., the target image 1410).

As shown in FIG. 9, the generation of the target image may be performed by the triple-lens camera in parallel, and the plurality of target images obtained via the processes may be stored in the DDR storage device according to a predetermined rule, and then be combined into a panorama. The predetermined rule may indicate the combination order of the generated target images.

In some embodiments, the predetermined rule may be set according to the arrangement of the imaging sensors. For example, if the imaging sensors are arranged from left to right, then the final panorama may also be combined from left to right. Correspondingly, the preset rule may include combining the target images in an order from left to right.

In some embodiments, during the combination process, when adjacent target images are overlapping with each other, the overlapping portions of the two adjacent target images may be fused by computing the weighted means of the corresponding pixels in the overlapping portions as the pixel values of the corresponding pixels in the generated panorama. Panoramas generated by the panorama device may then be outputted to a backend display (e.g., the display 121) in the format of a video stream.

In summary, embodiments of the present disclosure may have the following advantages:

1. In the present disclosure, after acquiring the plurality of source images (or video streams) and determining the block location information, according to each item of the block position information, the position of a corresponding source image block in the plurality of source images may be determined, and the source image block may then be retrieved from the plurality of source images. Based on the retrieved source image blocks, a plurality of target images may be generated, which may then be combined to form a combined image, such as a panorama or a stereogram. Via the above process, the efficiency of the generation of panoramas or any other type of combined image may be improved.

2. The processes for processing the plurality of source images (or video streams) may be independent of each another and be performed in parallel by the image processing device 130 (or the panorama device 100, e.g., a multi-lens camera), thereby improving the efficiency and real-time performance of the generation of panoramas. Meanwhile, it is easy to increase the number of the imaging sensors. For example, the number of the imaging sensors may be increased to 4, 5, 6, etc.

3. The block position information and/or one or more processing parameters of the panorama device 1000 may be determined in real-time. By optimizing the block position information and/or the one or more processing parameters, the obtained panorama may be seamless.

4. The data retrieving approach adopted in the present disclosure may be block oriented and be referred to as a three-level addressing approach. The three-level addressing approach may improve the data retrieving efficiency, and improve the real-time performance of the generation of panoramas (or combined images of any other type). The three-level addressing approach may include three addressing levels for retrieving data to generate a target image TI (e.g., the target image #1 in FIG. 9) for generating a panorama. In the first addressing level, the storage position (e.g., denoted in the form of a plurality of addresses or an address range) of a source image SI in a first storage device (e.g., the DDR storage device 910) may be obtained. The source image SI may be the data source for generating the whole target image TI. In the second addressing level, the storage position of a source image block SB of the source image SI in the first storage device may be obtained, and the source image block SB may then be transmitted (e.g., via a burst transmission protocol) from the first storage device to a second storage device (e.g., an RAM). The source image block SB may be the data source for generating a target image block TB, which may be a part of the target image TI. In the third addressing level, the storage position of one or more source pixels SP of the source image block SB in the second storage device may be obtained. The one or more source pixels SP may be the data source for generating a target pixel TP of the target image block TB.

5. A concept of initialization of starting coordinates of source image blocks is introduced in the present disclosure. The initialization of the starting coordinates of the source image block may be completed only in a time interval corresponding to one frame after the image processing device 130 (or the panorama device 1000) is powered on or one or more of the processing/imaging parameters of the panorama device 1000 are changed. With the determined block position information, the storage position of a source image block for generating a target image block in the first storage device may be predicted, and the source image block may be transmitted from the first storage device to the second storage device before the generation of the target image block is triggered, thereby improving the processing efficiency. Also, the initialization may be performed in real-time so that the processing/imaging parameters may be changed at any time. As a result, the image processing device 130 (or the panorama device 100) may adapt to any change of location, shooting angle, or environment, etc., of any one of the imaging sensors.

Having thus described the basic concepts, it may be rather apparent to those skilled in the art after reading this detailed disclosure that the foregoing detailed disclosure may be intended to be presented by way of example only and may be not limiting. Various alterations, improvements, and modifications may occur and are intended to those skilled in the art, though not expressly stated herein. These alterations, improvements, and modifications are intended to be suggested by this disclosure, and are within the spirit and scope of the exemplary embodiments of this disclosure.

Moreover, certain terminology has been used to describe embodiments of the present disclosure. For example, the terms "one embodiment," "an embodiment," and/or "some embodiments" mean that a particular feature, structure or characteristic described in connection with the embodiment may be included in at least one embodiment of the present disclosure. Therefore, it may be emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the present disclosure.

Further, it will be appreciated by one skilled in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely hardware, entirely software (including firmware, resident software, micro-code, etc.) or combining software and hardware implementation that may all generally be referred to herein as a "unit," "module," or "system." Furthermore, aspects of the present disclosure may take the form of a computer program product embodied in one or more computer readable media having computer readable program code embodied thereon.

A computer readable signal medium may include a propagated data signal with computer readable program code embodied therein, for example, in baseband or as part of a carrier wave. Such a propagated signal may take any of a variety of forms, including electro-magnetic, optical, or the like, or any suitable combination thereof. A computer readable signal medium may be any computer readable medium that may be not a computer readable storage medium and that may communicate, propagate, or transport a program for use by or in connection with an instruction execution system, apparatus, or device. Program code embodied on a computer readable signal medium may be transmitted using any appropriate medium, including wireless, wireline, optical fiber cable, RF, or the like, or any suitable combination of the foregoing.

Computer program code for carrying out operations for aspects of the present disclosure may be written in any combination of one or more programming languages, including an object oriented programming language such as Java, Scala, Smalltalk, Eiffel, JADE, Emerald, C++, C #, VB. NET, Python or the like, conventional procedural programming languages, such as the "C" programming language, Visual Basic, Fortran 2103, Perl, COBOL 2102, PHP, ABAP, dynamic programming languages such as Python, Ruby, and Groovy, or other programming languages. The program code may execute entirely on the user's computer, partly on the user's computer, as a stand-alone software package, partly on the user's computer and partly on a far-end computer or entirely on the far-end computer or server. In the latter scenario, the far-end computer may be connected to the user's computer through any type of network, including a local area network (LAN) or a wide area network (WAN), or the connection may be made to an external computer (for example, through the Internet using an Internet Service Provider) or in a cloud computing environment or offered as a service such as a Software as a Service (SaaS).

Furthermore, the recited order of processing elements or sequences, or the use of numbers, letters, or other designations therefore, may be not intended to limit the claimed processes and methods to any order except as may be specified in the claims. Although the above disclosure discusses through various examples what may be currently considered to be a variety of useful embodiments of the disclosure, it may be to be understood that such detail may be solely for that purposes, and that the appended claims are not limited to the disclosed embodiments, but, on the contrary, are intended to cover modifications and equivalent arrangements that are within the spirit and scope of the disclosed embodiments. For example, although the implementation of various components described above may be embodied in a hardware device, it may also be implemented as a software only solution, for example, an installation on an existing server or mobile device.

Similarly, it should be appreciated that in the foregoing description of embodiments of the present disclosure, various features are sometimes grouped together in a single embodiment, figure, or description thereof for the purposes of streamlining the disclosure aiding in the understanding of one or more of the various inventive embodiments. This method of disclosure, however, may be not to be interpreted as reflecting an intention that the claimed subject matter requires more features than are expressly recited in each claim. Rather, inventive embodiments lie in less than all features of a single foregoing disclosed embodiment.

In some embodiments, the numbers expressing quantities or properties used to describe and claim certain embodiments of the application are to be understood as being modified in some instances by the term "about," "approximate," or "substantially." For example, "about," "approximate," or "substantially" may indicate ±20% variation of the value it describes, unless otherwise stated. Accordingly, in some embodiments, the numerical parameters set forth in the written description and attached claims are approximations that may vary depending upon the desired properties sought to be obtained by a particular embodiment. In some embodiments, the numerical parameters should be construed in light of the number of reported significant digits and by applying ordinary rounding techniques. Notwithstanding that the numerical ranges and parameters setting forth the broad scope of some embodiments of the application are approximations, the numerical values set forth in the specific examples are reported as precisely as practicable.

Each of the patents, patent applications, publications of patent applications, and other material, such as articles, books, specifications, publications, documents, things, and/or the like, referenced herein may be hereby incorporated herein by this reference in its entirety for all purposes, excepting any prosecution file history associated with same, any of same that may be inconsistent with or in conflict with the present document, or any of same that may have a limiting affect as to the broadest scope of the claims now or later associated with the present document. By way of example, should there be any inconsistency or conflict between the description, definition, and/or the use of a term associated with any of the incorporated material and that associated with the present document, the description, definition, and/or the use of the term in the present document shall prevail.

In closing, it is to be understood that the embodiments of the application disclosed herein are illustrative of the principles of the embodiments of the application. Other modifications that may be employed may be within the scope of the application. Thus, by way of example, but not of limitation, alternative configurations of the embodiments of the application may be utilized in accordance with the teachings herein. Accordingly, embodiments of the present application are not limited to that precisely as shown and describe.

We claim:

1. A method for image processing, implemented on an image processing device, comprising:
obtaining a plurality of source images generated by a plurality of imaging sensors;
storing the plurality of source images into a first storage device of the image processing device;
processing each of the plurality of source images by:
retrieving a plurality of source image blocks from the source image according to block position information associated with the corresponding imaging sensor by:
transmitting, via a burst transmission protocol, according to the block position information associated with the corresponding imaging sensor, an ith source image block from the first storage device to a second storage device of the image processing device, wherein i is an integer between 1 and the total number of the source image blocks, and data of the ith source image block for generating an ith target image block is retrieved from the second storage device;
generating, for each of the plurality of source image blocks, a target image block based on the source image block; and
forming a target image based on the generated target image blocks; and
generating a combined image based on the target images.

2. The method of claim 1, further comprising obtaining the block position information associated with each of the plurality of imaging sensors by:
retrieving a plurality of calibration source images generated by the plurality of imaging sensors;
generating, based on the plurality of calibration source images, a plurality of calibration target images; and
for each of the plurality of imaging sensors:
dividing the corresponding calibration target image into a plurality of calibration target image blocks;
for each of the plurality of calibration target image blocks, identifying an image region in the calibration source image including pixels for generating the calibration target image block as a corresponding calibration source image block; and
obtaining the block position information associated with the imaging sensor indicating positions of the calibration source image blocks in the corresponding calibration source image.

3. The method of claim 2, the identifying an image region in the calibration source image including pixels for generating the calibration target image block as a corresponding calibration source image block, comprising:
for each pixel of the calibration target image block:
identifying one or more pixels in the calibration source image used for generating the pixel; and
obtaining a coordinate range of the plurality of source pixels in the calibration source image, wherein the calibration source image block is an image portion within the coordinate range.

4. The method of claim 2, wherein:
the source image is a frame of a digital video stream; and
the calibration source image is a frame of the digital video stream before the source image.

5. The method of claim 2, further comprising:
determining whether a change occurs to one or more imaging parameters of a target imaging sensor of the plurality of imaging sensors; and
in response to determining that a change occurs to the one or more imaging parameters of the target imaging sensor of the plurality of imaging sensors, re-obtaining at least the block position information of the target imaging sensor.

6. The method of claim 1, wherein the generating, for each of the plurality of source image blocks, a target image block based on the source image block comprises processing the source image block by:
retrieving, for generating a jth target pixel of the ith target image block, data of one or more source pixels of the ith source image block needed for generating the jth target pixel from the second storage device, wherein j is an integer between 1 and the total number of the target pixels of the ith target image block; and
computing data of the jth target pixel based on the data of the one or more source pixels retrieved.

7. The method of claim 1, wherein:
the image processing device includes multiple second storage devices;
the plurality of source image blocks are transmitted from the first storage device to the multiple second storage devices in turn; and
the processing of a first source image block in one of the multiple second storage devices and the transmission of a second source image block from the first storage device to another one of the multiple second storage devices are performed concurrently.

8. The method of claim 1, wherein:
the image processing device includes multiple second storage devices;
each of the multiple second storage devices is in communication with a processing core of the image processing device; and
the processing cores operate concurrently to generate the target image blocks based on the source image blocks transmitted to the corresponding second storage devices.

9. A system for image processing, comprising:
a plurality of imaging sensors;
a storage medium, including instructions; and
at least one processor in communication with the storage medium, wherein when executing the instructions, the at least one processor is directed to:
obtain a plurality of source images generated by the plurality of imaging sensors;
store the plurality of source images into a first storage device of the image processing device;
process each of the plurality of source images by:
retrieving a plurality of source image blocks from the source image according to block position information associated with the corresponding imaging sensor by:
transmitting, via a burst transmission protocol, according to the block position information associated with the corresponding imaging sensor, an ith source image block from the first storage device to a second storage device of the image processing device, wherein i is an integer between 1 and the total number of the source image blocks, and data of the ith source image block for generating an ith target image block is retrieved from the second storage device;

generating, for each of the plurality of source image blocks, a target image block based on the source image block; and forming a target image based on the generated target image blocks; and generate a combined image based on the target images.

10. The system of claim 9, wherein the at least one processor is directed further to obtain the block position information associated with each of the plurality of imaging sensors by:

retrieving a plurality of calibration source images generated by the plurality of imaging sensors;

generating, based on the plurality of calibration source images, a plurality of calibration target images; and for each of the plurality of imaging sensors:

dividing the corresponding calibration target image into a plurality of calibration target image blocks;

for each of the plurality of calibration target image blocks, identifying an image region in the calibration source image including pixels for generating the calibration target image block as a corresponding calibration source image block; and obtaining the block position information associated with the imaging sensor indicating positions of the calibration source image blocks in the corresponding calibration source image.

11. The system of claim 10, the identifying an image region in the calibration source image including pixels for generating the calibration target image block as a corresponding calibration source image block, comprising:

for each pixel of the calibration target image block:

identifying one or more pixels in the calibration source image used for generating the pixel; and obtaining a coordinate range of the plurality of source pixels in the calibration source image, wherein the calibration source image block is an image portion within the coordinate range.

12. The system of claim 10, wherein:

the source image is a frame of a digital video stream; and the calibration source image is a frame of the digital video stream before the source image.

13. The system of claim 10, wherein the at least one processor is directed further to:

determine whether a change occurs to one or more imaging parameters of a target imaging sensor of the plurality of imaging sensors; and in response to determining that a change occurs to the one or more imaging parameters of the target imaging sensor of the plurality of imaging sensors, re-obtain at least the block position information of the target imaging device.

14. The system of claim 10, wherein the at least one processor is directed further to:

determine whether an additional imaging sensor is added to the plurality of imaging sensors; and in response to determining that the additional imaging sensor is added to the plurality of imaging sensors, obtain the block information of the additional imaging sensor.

15. The system of claim 9, wherein to generate, for each of the plurality of source image blocks, a target image block based on the source image block, the at least one processor is directed to process the source image block by:

retrieving, for generating a jth target pixel of the ith target image block, data of one or more source pixels of the ith source image block needed for generating the jth target pixel from the second storage device, wherein j is an integer between 1 and the total number of the target pixels of the ith target image block; and computing data of the jth target pixel based on the data of the one or more source pixels retrieved.

16. The system of claim 9, wherein:

the system includes multiple second storage devices;

the plurality of source image blocks are transmitted from the first storage device to the multiple second storage devices in turns; and the processing of a first source image block in one of the multiple second storage devices and the transmission of a second source image block from the first storage device to another one of the multiple second storage devices are performed concurrently.

17. The system of claim 9, wherein to form a target image based on the generated target image blocks, the at least one processor is directed to:

construct a continuous storage region in a third storage device for storing the data of pixels of the target image, wherein the continuous storage region includes continuous storage units, each of which corresponds to a pixel of the target image; and store the target image blocks into the continuous storage region.

18. A non-transitory computer readable medium, comprising instructions compatible for image processing, wherein when executed by at least one processor of an electronic device, the instructions direct the at least one processor to execute an image processing process, which comprises:

obtaining a plurality of source images generated by a plurality of imaging sensors;

storing the plurality of source images into a first storage device of the image processing device;

processing each of the plurality of source images by:

retrieving a plurality of source image blocks from the source image according to block position information associated with the corresponding imaging sensor by:

transmitting, via a burst transmission protocol, according to the block position information associated with the corresponding imaging sensor, an ith source image block from the first storage device to a second storage device of the image processing device, wherein i is an integer between 1 and the total number of the source image blocks, and data of the ith source image block for generating an ith target image block is retrieved from the second storage device;

generating, for each of the plurality of source image blocks, a target image block based on the source image block; and forming a target image based on the generated target image blocks; and generating a combined image based on the target images.

* * * * *